United States Patent
Tadayon et al.

(10) Patent No.: US 12,487,370 B1
(45) Date of Patent: Dec. 2, 2025

(54) SYSTEMS, METHODS, AND APPARATUS TO OBTAIN THE ORIENTATION OF PLATFORMS

(71) Applicants: Navid Tadayon, Nepean (CA); Ahmad Vakili, Ottawa (CA)

(72) Inventors: Navid Tadayon, Ottawa (CA); Ahmad Vakili, Ottawa (CA)

( * ) Notice: Subject to any disclaimer, the term of this patent is extended or adjusted under 35 U.S.C. 154(b) by 480 days.

(21) Appl. No.: 17/703,913

(22) Filed: Mar. 24, 2022

(51) Int. Cl.
*G01S 19/46* (2010.01)
*G01S 19/43* (2010.01)

(52) U.S. Cl.
CPC .............. *G01S 19/46* (2013.01); *G01S 19/43* (2013.01)

(58) Field of Classification Search
CPC ................................ G01S 19/46; G01S 19/43
USPC ...................................................... 342/357.29
See application file for complete search history.

(56) References Cited

U.S. PATENT DOCUMENTS

| 2015/0198719 A1* | 7/2015 | Mulherin | ................... G01S 5/14 342/357.29 |
| 2015/0350924 A1* | 12/2015 | Schmidt | ................ H04W 16/28 370/315 |

FOREIGN PATENT DOCUMENTS

CN        110444855 A   * 11/2019  ............... H01Q 1/22

* cited by examiner

*Primary Examiner* — Harry K Liu

(57) ABSTRACT

Aspects of the disclosure relates to systems, methods, and apparatuses for improving the orientation data of multiplicity of users. In one embodiment, the orientation data is generated from synchronous processing of phase information extracted from transmit points transmitting reference signals to multiplicity of users. The transmit points can be one or more reference points of known location and orientation and one or more users which locations and orientations are necessarily known. In another embodiment, the reference points are one or more GNSS satellites/relays that transmit/forward the GNSS signals to multiplicity of users. The users then coherently process the received signals across of plurality of array of receivers.

14 Claims, 15 Drawing Sheets

SYSTEMS, METHODS, AND APPARATUS TO OBTAIN THE ORIENTATION OF PLATFORMS

BACKGROUND OF THE INVENTION

Primer

A platform's pose is defined by its location and orientation in a coordinate system of interest. In 3D space, pose is represented by six parameters, three related to the location and another three to the orientation. The Orientation of a platform is defined as the rotation of each axis of a body-fixed coordinate system (namely body frame, denoted by b) w.r.t another coordinate system (namely navigation frame, denoted by n). The orientation can be represented by three angles yaw (a.k.a. heading), pitch, and roll. We can also represent the orientation by a rotation matrix $R^{bn}$. Theoretically, to estimate the orientation of the platform w.r.t navigation frame of reference, at least two non-colinear (independent) vectors $y_1$ and $y_2$ are needed with representations given in both body-fixed and navigation coordinate frames. Mathematically speaking $$[y_1^b, y_2^b] = R^{bn} \cdot [y_1^n, y_2^n] \quad (1)$$

The challenge in estimating the orientation (a.k.a. direction finding) of a platform is in finding the two aforementioned vectors which are reliable. The latter requirement led to development of the following approaches over the years:

1) Magnetic, angular rate, and gravity (MARG) sensors includes gyroscope that measures the angular rate of rotation, accelerometer that measures the exerted force on the body coordinate frame, and a magnetometer that measures the strength and direction of the magnetic field. In the ideal world, where (a) there is no body inertial acceleration, (b) there is no magnetic disturbance from nearby ferromagnetic materials, and (c) there is no bias term in accelerometer and gyroscope readings, these sensors are sufficient to observe/estimate the orientation of the platform in the navigation frame. In spite of this idealistic scenario, in practice, all sensors have time-varying biases, the user is mobile, and magnetic disturbance is a real issue. With these constraints in place, not enough equations exist to estimate the platform orientation with bounded error solely with MARG sensors. The problem is especially exacerbated with the magnetometer reading as an unreliable vector of information. The error on the magnetometer is often so high that system designer has no choice but to opt out of it leaving in place only the inertial measurement unit (IMU) that is composed of accelerometer and gyroscope.

2) MARG sensors rely on measuring the physical forces of gravity and magnetic field which have known directionality and magnitude. An alternative approach to deal with the aforementioned shortcomings is to rely on landmarks which locations in the global frame of reference is fixed and known. Setting aside the out-of-date approach of using natural landmarks for direction-finding, the contemporary approach is in utilizing man-made landmarks. In that vein, the past several decades evidenced the emergence of many such approaches. With the objective having been to create a global infrastructure that is accessible by all users on the ground, these landmarks were put in the space to provide the maximum coverage with the minimum infrastructure and maintenance cost. The culmination of these efforts was the development of the Global navigation satellite systems (GNSS). The ramification of the long distance between these space-borne landmarks and the user on earth is that not every sensing modality known to human can be used to sense their presence. How can a user estimate the distance to a GNSS satellite at the altitude of 20,200 km using camera/vision, Lidar, or ultrasonic sensors? This led to a design choice where the GNSS satellites transmitting signals at specific portion of the radio frequency (RF) spectrum that is suitable for long-range propagation and the users on the ground exploiting RF sensing modalities to detect the presence of the emitted signals. Whereas GNSS emerged solely as a universal infrastructure to localize users on earth, in the sky, and on the sea, it took engineers a few decades to realize that GNSS can also be used to find the orientation of mobile users w.r.t the global coordinate frame. Specifically, GNSS-based direction-finding was enabled by the invention of a complex technique, known as real-time-kinematics (RTK). The invention of the RTK initially sought a different purpose, that is, to obtain far better location (position) accuracy that is not possible with the classic range-based GPS signal processing. However, it didn't take researchers long to realize that it is exactly the precision positioning of more than one point on a mobile platform that enables estimation of that platform's orientation. Despite its great success, RTK-GPS suffers from significant shortcoming, such as high cost, complexity, low availability, and intermittent continuity.

3) Space-borne artificial landmarks are not the only type for direction finding. Conceptually, airborne, or terrestrial landmarks, which locations are accurately known in the navigation frame, can also be used for direction finding. An example of such landmarks are terrestrial base-stations (such as 4G/5G BSs) which locations are precisely known. It is only when going beyond conceptual thinking that the shortcomings of terrestrial-based direction finding come to the surface: direction finding is extremely prone to lack of line-of-sight (LoS) between the mobile user, which orientation is unknown, and the landmarks. Known as non-LoS (NLoS), the latter can be a frequent occurrence when the elevation angle between the landmark and the mobile platform is low. Unfortunately, this is the case for landmarks on earth where physical blockages can obstruct the path between the landmark and platform. When it happens, NLoS can be a killer for direction finding even if the location estimate obtained under same circumstance can still be meaningful. For this reason, direction-finding using terrestrial landmarks is often hopeless as long as NLoS is a problem. This is aside from the fact that providing universal sensing coverage with terrestrial landmarks does not have economic justifications.

DESCRIPTION OF PRIOR ART

Brief Overview of Prior Art

The state-of-the-art on precise estimation of a mobile platform's orientation is known as moving baseline real-time kinematics (RTK) [1, 2]. The approach relies on processing phase measurements collected across multiple receivers, asynchronously. The phase measurements at the receivers are contaminated by slowly varying errors of additive nature. To remove these errors, measurements should be high-pass-filtered by differencing which consequence is the inevitable introduction of the baseline vector extending from one receiver to the other as the vector of interest to be estimated.

The reliability of this baseline vector as the source of orientation information crucially depends on its magnitude, which, subsequently, depends on how far the two receivers are placed from each other. Since the RTK receivers are often required to be tightly integrated inside a small chipset, multi-receiver RTK inevitably requires the antennas, corresponding to those receivers, to be placed far from each other to be able to guarantee sufficient distance between their phase centers. Bounded by nominal orientation estimation requirements, the inter-receiver distance needs to be at least several tens of centimeters. This baseline length constraint is a huge hindrance towards the practicability of multi-receiver RTK for numerous applications where the form-factor of the platform, which orientation is to be estimated, does not allow such wide-spanned placement of antennas.

The placement of a GNSS antenna far from its receiver has other ramifications as well; GNSS signal is so weak that it often cannot afford propagating through a meter long cable running between the non-collocated antenna and receiver. This means that noise floor will have to be set at the location of the antenna using active antennas that have quality electronics, such as low-noise amplifiers, a solution that is bulky and expensive. Additionally, a significant amount of calibration effort is needed to make sure that antenna phase centers are properly calculated, cable length running between receiver and antennas is compensated for when measuring range to satellites, and the direction of the baseline vector in body frame of reference is accurately known. All these aside, it is the inescapable problem of having to deal with integer ambiguities that stands above all imposing long reacquisition intervals every time that phase lock is lost. This makes multi-receiver RTK a solution that suffers from low availability when operating in urban and sub-urban areas where the "open-sky" assumption is violated.

Technical Aspects of Prior Art

GNSS satellites are at high elevation angles (hence less possibility of NLoS), can provide global coverage, require minimal maintenance, and follow a very predictable motion path. Therefore, they are the natural choice for pose estimation. However, as mentioned earlier, an ordinary GNSS receiver is incapable of accurately estimating orientation dimension of pose. This is because of the nature of estimating time with a signal which bandwidth is only a few megahertz and which received power is only a few dB higher than the noise floor. The truth of the fact is that the GNSS signal induced at the antenna input has the strength of −160 dB due to significant path loss (∼−150 dB). In fact, before the matched filtering, the GNSS signal is completely swamped by the receiver noise, and it is the processing gain of the matched filter that results in the signal to rise just enough above the noise floor to be detectable.

Without being able to delve into the details of its derivations, the range measurements obtained from a GNSS satellite (indexed k) and the receiver (denoted by r) can be modelled as $$\rho_r^{(k)} = r_r^{(k)} + I_\rho^{(k)} + T_\rho^{(k)} + c(b_r - b_s^{(k)}) + \epsilon_{\rho,r}^{(k)} \quad (2)$$

where $r_r^{(k)}$ is the true distance between the satellite and the receiver, $\rho_r^{(k)}$ is the estimated distance between the two, $I_\rho^{(k)}$, $T_\rho^{(k)}$ are the terms representing the slowdown of the satellite signal due to diffraction as it passes through ionospheric and tropospheric layers of atmosphere, respectively, $b_r$ is the clock bias of the receiver, $b_s^{(k)}$ is the clock bias of the satellite, and $\epsilon_{\rho,r}^{(k)}$ is the range estimation noise. This model is very general and comprises the basis of code-based positioning with GNSS. Error term $\epsilon_{\rho,r}^{(k)}$ is called the measurement noise (in meter) and is a random variable to account for the effect of thermal noise at the receiver as well as the shape of the waveform and bandwidth. It also includes the effect of multipath happening in the proximity of the receiver (modeling uncertainty). The goal of the GNSS receiver is to obtain an estimate of the distance to the satellite that is as close to the true value as possible. The hindrance along the way is the existence of all the undesired error terms as shown in (2).

A successful, yet simple, approach to deal with the abovementioned undesired factors in GNSS signal processing is called "differencing". Let's assume the existence of two receivers, denoted by u, r, on a rigid mobile platform which locations are unknown. From (2), the measurements at these two receivers are given by $$\rho_r^{(k)} = r_r^{(k)} + I_\rho^{(k)} + T_\rho^{(k)} + c(b_r - b_s^{(k)}) + \epsilon_{\rho,r}^{(k)}$$

$$\rho_u^{(k)} = r_u^{(k)} + I_\rho^{(k)} + T_\rho^{(k)} + c(b_u - b_s^{(k)}) + \epsilon_{\rho,u}^{(k)} \quad (3)$$

Differencing these measurements from each other results in elimination of some of the undesired terms in (3):

$$\nabla \rho_{ru}^{(k)} = \rho_r^{(k)} - \rho_u^{(k)} = \underbrace{\left(r_r^{(k)} - r_u^{(k)}\right)}_{\nabla r_{ru}^{(k)}} + c\underbrace{(b_r - b_u)}_{\nabla b_{ru}} + \nabla \epsilon_{\rho,ru}^{(k)} \quad (4)$$

The term $\nabla r_{ru}^{(k)}$ in (4) is called the differential range. As shown in FIG. 1, if the GNSS signal wavefront arriving at the receivers is completely planar, it can be shown that the scalar $\nabla r_{ru}^{(k)}$ is related to the baseline vector 101 $x_{ur} = x_u - x_r$ connecting the location of the first receiver (denoted by $x_r$) 103 to the location of the second receiver (denoted by $x_u$) 102 through the following formula $$\nabla r_{ru}^{(k)} = -(1^{(k)})^T \cdot x_{ur} \quad (5)$$

where $1^{(k)}$ 104 is the unit vector extending from the location of the receiver 103 to the location of the satellite 105 and $(\ )^T$ is the transpose operation. FIG. 1 illustrates the single-differential range calculated by subtracting measurements obtained from a single satellite signal. Substituting (5) into (4) and stacking single-differenced observations obtained from multiple GNSS satellite signals yields $$\begin{bmatrix} \nabla \rho_{ru}^{(1)} \\ \vdots \\ \nabla \rho_{ru}^{(K)} \end{bmatrix} = \begin{bmatrix} (1^{(1)})^T \\ \vdots \\ (1^{(K)})^T \end{bmatrix} x_{ur} + \begin{bmatrix} 1 \\ \vdots \\ 1 \end{bmatrix} c \nabla b_{ru} + \begin{bmatrix} \nabla \epsilon_{\rho,ru}^{(1)} \\ \vdots \\ \nabla \epsilon_{\rho,ru}^{(K)} \end{bmatrix} \quad (6)$$

Since single-differencing, as in (6), does not eliminate $\nabla b_{ru}$, which is the differential clock bias between the two receivers, a second differencing is performed by subtracting the single-differenced observations (6) belonging to two separate satellites k and l $$\Delta \nabla \rho_{ru}^{(k)} = \nabla \rho_{ru}^{(k)} - \nabla \rho_{ru}^{(l)} = \underbrace{(\nabla r_{ru}^{(k)} - \nabla r_{ru}^{(l)})}_{\nabla \Delta r_{ru}^{(k,l)}} + \underbrace{(\nabla \epsilon_{\rho,ru}^{(k)} - \nabla \epsilon_{\rho,ru}^{(l)})}_{\nabla \Delta \epsilon_{\rho,ru}^{(k,l)}} \quad (7)$$

This is shown in FIG. 2 for K satellites. Assuming a reference satellite 200 when obtaining double differenced observation for an arbitrary number of satellites K, denoting this reference satellite 200 by the index l=1, we can stack up all the double-differenced equations in matrix form, one yields $$\begin{bmatrix} \Delta\nabla\rho_{ru}^{(2,1)} \\ \vdots \\ \Delta\nabla\rho_{ru}^{(K,1)} \end{bmatrix} = \underbrace{\begin{bmatrix} (1^{(2)} - 1^{(1)})^T \\ \vdots \\ (1^{(K)} - 1^{(1)})^T \end{bmatrix}}_{G} x_{ur} + \underbrace{\begin{bmatrix} \Delta\nabla\epsilon_{\rho,ru}^{(2,1)} \\ \vdots \\ \Delta\nabla\epsilon_{\rho,ru}^{(K,1)} \end{bmatrix}}_{e_\rho} \quad (8)$$

FIG. 1b depicts how the double differenced measurement is related to the baseline vector 201. This equation can be readily used to estimate the unknown vector $x_{ur}$ 202. Since the location of none of the receiver r 203 and receiver u 204 is known, $x_{ur}$ 202 is called relative positioning vector. The value of $x_{ur}$ 202 is one of the vectors in (1) that is needed to estimate the orientation of the platform on which the receivers u and r are rigidly mounted. With a third receiver strapped on the platform, the second independent can be obtained from which orientation may unambiguously be estimated.

The estimation accuracy of $x_{ur}$ 202, depends on the variance of the estimation noise $e_\rho$. This variance is dictated by the bandwidth and SNR of the received GNSS signal. In a nutshell, the covariance of this noise is often so large that, unless the two receivers are a few meters apart, the accuracy of $x_{ur}$ will be very poor. Unfortunately, the use-cases for which the estimation of $x_{ur}$ is valid hardly comprises the interesting cases. On the contrary, modern life now depends more than ever on knowing the orientation of miniaturized mobile platforms and instruments. This makes using ordinary GPS for orientation estimation an inept approach.

To tackle the problem of high covariance on the noise vector $e_\rho$ in (8), an alternative solution was sought by RTK-GPS which is to lock on the phase of the GNSS signals arriving from multiple satellites. Under an idealistic situation, the measured fractional phase of the GNSS signal $N_{frac}$ is related to the wavelength $\lambda$ of the signal, the distance r between the satellite and the user, and the whole number of RF cycles $N_{int}$ between the satellite and the user through the following formula $$N_{frac} = \lambda^{-1} r + N_{int} \quad (9)$$

Adding to (9) the realistic effects that were introduced in (2), the following model is obtained for the observed phase of the signal instead of the apparent range (as in (2)):

$$\phi_u^{(k)} = \lambda^{-1}(r_u^{(k)} + I_\rho^{(k)} + T_\rho^{(k)}) + f(b_u - b_k) + N_u^{(k)} + \epsilon_\phi^{(k)} \quad (10)$$

where $\epsilon_\phi^{(k)}$ is the phase estimation noise at the receiver u from the signal arriving of satellite k.

The goal of RTK-GPS is to use phase measurements $\epsilon_\phi^{(k)}$, $\forall k=1 \ldots K$, in (10), which noise is much less than that of code measurements $\rho_r^{(k)}$ in (2), to obtain a more accurate estimate of the true distance $r^{(k)}$ to the satellites, and subsequently estimate the orientation and location of the platform. Whereas phase measurements in (10) are less contaminated by measurement noise compared to code measurements in (2), they are still contaminated by the same non-idealities such as atmospheric errors and different clock biases.

Due to the composition of these errors, the same double-differencing approach results in the elimination of the latter errors as shown in (11):

$$\underbrace{\begin{bmatrix} \Delta\nabla\phi_{ru}^{(2,1)} \\ \vdots \\ \Delta\nabla\phi_{ru}^{(K,1)} \end{bmatrix}}_{\Delta\nabla\phi} = \lambda^{-1} \underbrace{\begin{bmatrix} (1^{(2)} - 1^{(1)})^T \\ \vdots \\ (1^{(K)} - 1^{(1)})^T \end{bmatrix}}_{G} x_{ur} + \underbrace{\begin{bmatrix} N_{ru}^{(2,1)} \\ \vdots \\ N_{ru}^{(K,1)} \end{bmatrix}}_{N} + \underbrace{\begin{bmatrix} \Delta\nabla\epsilon_{\phi,ru}^{(2,1)} \\ \vdots \\ \Delta\nabla\epsilon_{\phi,ru}^{(K,1)} \end{bmatrix}}_{e_\phi} \quad (11)$$

Like before, the double differencing creates differenced range measurements $\Delta\Box r_{ru}^{(k,1)}$. While these are the parameters relevant for pose estimation, a new struggle emerges in RTK, which is to estimate the nuisance parameters $N_u^{(k)}$ called integer ambiguities. Unfortunately, double differencing does not eliminate these ambiguities, rather, transform them from one form to another. This is because (like range $r_u^{(k)}$ itself) the integer ambiguity $N_u^{(k)}$ is not only a function of the satellite location (index) but also user location (index), hence differencing across satellite and user locations cannot eliminate them.

Estimating $x_{ur}$ in (11) is still not possible because there are K+2 unknowns which is more than k-1 available observations. To solve this problem, RTK receivers process double-differenced phase measurements obtained across time and frequency to be able to resolve integer ambiguity and, subsequently, estimate the baseline vector. Various approaches emerged over the years to tackle this problem some of which are mentioned here as state-of-the-art:

Combining Phase Measurements in Time

In this approach, the receiver keeps lock on the phase of all the satellite signals from which double-differenced phases were extracted. Locking on the phase while collecting observations across time means that vector the $\Delta\nabla\phi$ and matrix G in (11) vary with time but N remains fixed as time passes by. Under this phase locking constraint, differencing two matrix observation equation in (11), across time (e.g., $t_1$ and $t_2$) results in the elimination of the nuisance vector parameter N:

$$\underbrace{\Delta\nabla\phi(t_2) - \Delta\nabla\phi(t_1)}_{\delta\Delta\nabla\phi} = \lambda^{-1}\underbrace{(G(t_2) - G(t_1))}_{\delta G}x_{ur} + \underbrace{e_\phi(t_2) - e_\phi(t_1)}_{\delta e_\phi} \quad (12)$$

This approach suffers from a severe shortcoming: If the interval $\delta t = t_2 - t_1$ is not long enough, the matrix $\delta G$ will not be invertible as it is necessary to solve (12). Practically speaking, given the high altitude of the GPS satellites, $\delta t$ should be in the order of minutes to yield a well-conditioned matrix $\delta G$. During this interval, the lock on all signals should be maintained. If this constraint is violated, phase reacquisition is necessary during which time, no orientation estimate is available.

Combining Code and Carrier Phase Measurements

An alternative approach is to jointly process the code-based GNSS measurements in (8) along with carrier-phase GNSS measurements in (11) to estimate the baseline vector and integer ambiguities at the same time. Due to the fact that the estimation noise on code-phase measurement is large, this approach only works if sufficient averaging is performed to obtain a reliable final estimate. This approach again suffers from the same shortcoming as before: In the previous case, time is needed for the satellite to move appreciably to improve the rank of the matrix G. Here time is needed to make the estimates reliable by averaging. In both cases, every time the lock is lost, we should update the estimates of the integer ambiguities which implies that we have to wait long enough for sufficient observations to be collected. Therefore, this method suffers from the lack of robustness as well. In comparison to the previous approach, where integer ambiguities are eliminated by temporal differencing, the goal here is to estimate the integer-ambiguities. However, because the latter are integer quantities, the optimization formulation formed to solve this estimation problem is of combinatorial nature. Unfortunately solving combinatorial problems is not easy as it involves searching through the space (or subspace) of hypotheses exhaustively. This algorithmic complication is another shortcoming of RTK-GPS. In fact, a prevalently known method of resolving the integer ambiguity is the LAMBDA method that relies on solving an integer least square problem.

Combining Code and Carrier Phase Measurements in Time and Frequency

If the RTK receiver is able to obtain estimates of GNSS signal phases at two or more frequencies, then it can resolve the integer ambiguities faster. This still does not change the combinatorial nature of the problem rather change the optimization problem to one that is less ill-posed. For instance, an algorithm called (extra-) wide-lanning exists that operates on the basis of differencing the measurements obtained at two or more frequencies. As such, it takes less time to acquire the phase lock. Also, every time that the lock is lost, the phase can be recovered more quickly. Unfortunately, this is an expensive solution due to its reliance on multi-frequency RTK hardware and expansive amount of computation needed. Moreover, multi-frequency RTK still suffers from low availability as it takes tens of seconds to require the phase lock once it is lost.

BRIEF SUMMARY OF THE INVENTION

Figure 1:
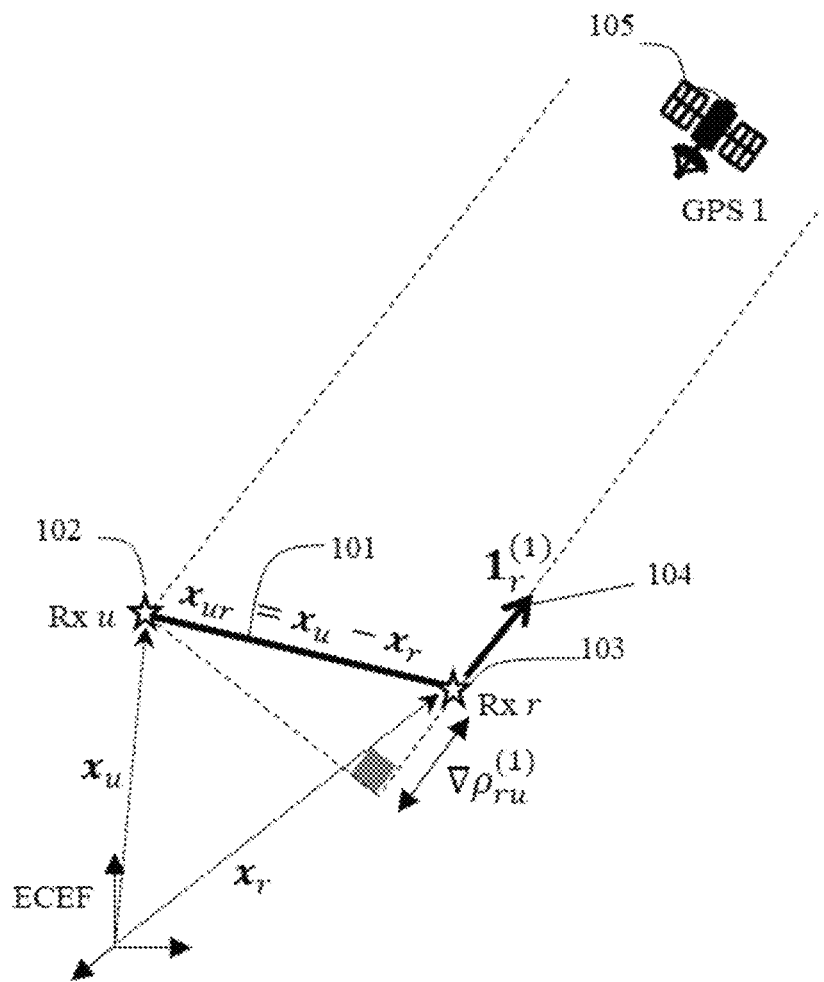
FIG. 1. Single Differencing of GNSS signal.
Figure 2:
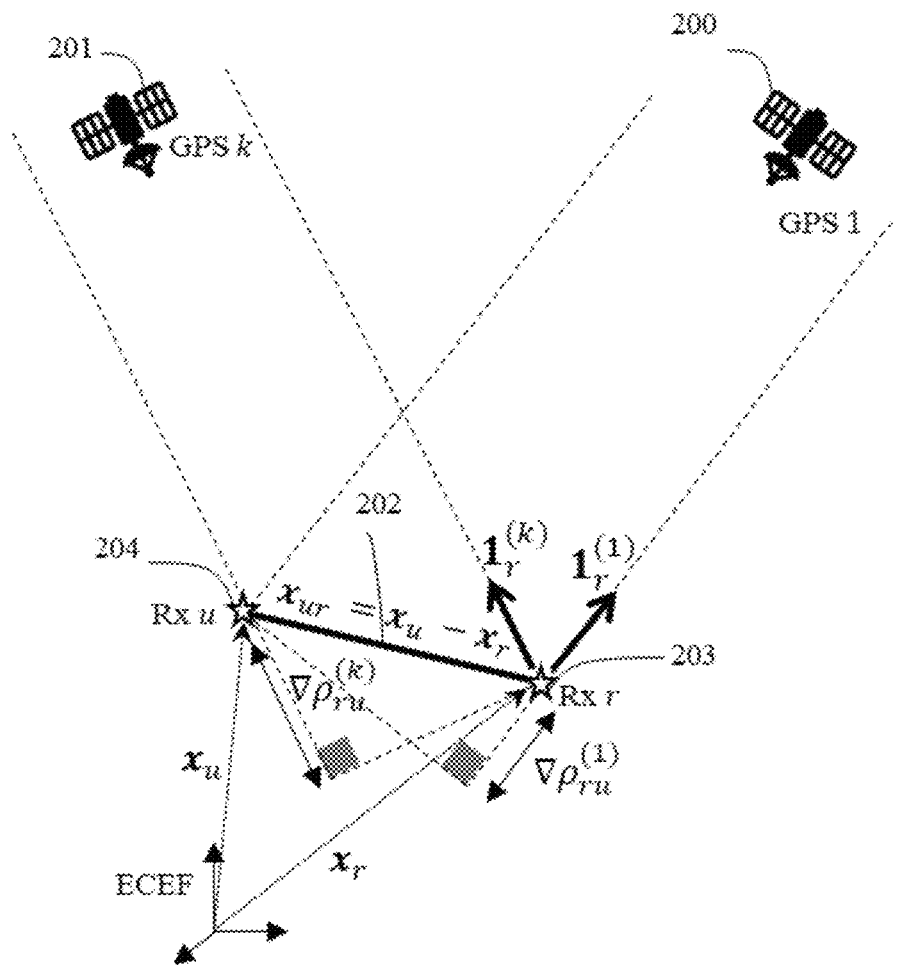
FIG. 2. Double Differencing of GNSS signal.

This invention discloses the details of the methods and apparatuses to obtain the orientations of plurality of mobile platforms using measurements obtained by measuring phases of some reference signals (RSs) that are exchanged between some anchor (reference) points and some mobile platforms as well as between the mobile platforms themselves. According to one aspect of the present disclosure, the anchor points are the GNSS satellites, and the measurements collected at each mobile platform are the coherent phases that are obtained by synchronously processing the GNSS signal samples across space. According to another aspect of the present disclosure, each mobile platform estimates its orientation independently of other platforms by only processing the coherent phase measurements obtained from RSs transmitted by the anchor points. According to another aspect of the present disclosure, the orientations of multiple nearby platforms are estimated jointly either by central or distributed processing of the angular and locational measurements that are collected by the plurality of the platforms which are dispersed across a geographical area. In some other aspects of the disclosure, some statistics of the received reference signals are exploited to decide about the processing graph that is needed to formalize the joint estimation problem with the objective being to tackle issues such as non-line-of-sight (NLOS), bad geometry, low SNR, etc. According to aspects of the present disclosure, the apparatus to enable the aforementioned orientation estimation problem comprises arrays of antennas to be able to obtain coherent phase measurements from the RSs exchanged between plurality of anchor points and mobile platforms. The apparatus may also comprise communication transceivers and other resources to exchange information such as the measurements and estimated orientations between the mobile platforms and the processing unit.

Having given this summary about the aspects of this invention, in the following the authors briefly describe some of the technical aspects of the single platform and multi-platform orientation estimation problems. More detailed aspects of this invention will be presented in another section.

Single Platform Orientation Estimation

Let us adopt the phase measurement model in (10) obtained from jth satellite signal at kth GNSS receiver. Note that we change the satellite index from k to j, hereinafter:

$$\phi_k^{(j)} = \lambda^{-1}(r_k^{(j)} + I_\rho^{(j)} + T_\rho^{(j)} + f \cdot (b_k - b_j) + N_m^{(j)} + \epsilon_\phi^{(j)} \qquad (13)$$

Let us assume that these phase measurement on k=1 ••• K receivers are obtained coherently. The coherence between these phase measurements requires that the signal induced on all the receivers are sampled synchronously. For instance, if this is happening in digital domain, the analog-to-digital converters (ADC) are to be utilized that are driven by the same reference clock/oscillator. This being the case, there is no clock bias on the measurements, yielding $b_k=b$, $\forall k$. Moreover, assume that the distance between two adjacent receivers (denoted by indices k and k+1) is a fraction of the GNSS signal wavelength λ. This constraint guarantees that the integer ambiguity will be the same for the two receivers, that is, $N_k^{(j)} = N_{k+1}^{(j)}$. With these constraints in place, the phases of the two coherent receivers are given by $$\phi_k^{(j)} = \lambda^{-1}(r_k^{(j)} + I_\rho^{(j)} + T_\rho^{(j)} + f(b - b_j) + N_k^{(j)} + \epsilon_\phi^{(k,j)}$$

$$\phi_{k+1}^{(j)} = \lambda^{-1}(r_{k+1}^{(j)} + I_\rho^{(j)} + T_\rho^{(j)} + f(b - b_j) + N_k^{(j)} + \epsilon_\phi^{(k+1,j)} \qquad (14)$$

Subtracting the two phase equation in (14) yields $$\Delta\phi_k^{(j)} = \phi_{k+1}^{(j)} - \phi_k^{(j)} = \lambda^{-1} \cdot \underbrace{(r_{k+1}^{(j)} - r_k^{(j)})}_{\Delta r_k^{(j)}} + \Delta\epsilon_\phi^{(k,j)} \qquad (15)$$

Figure 3:
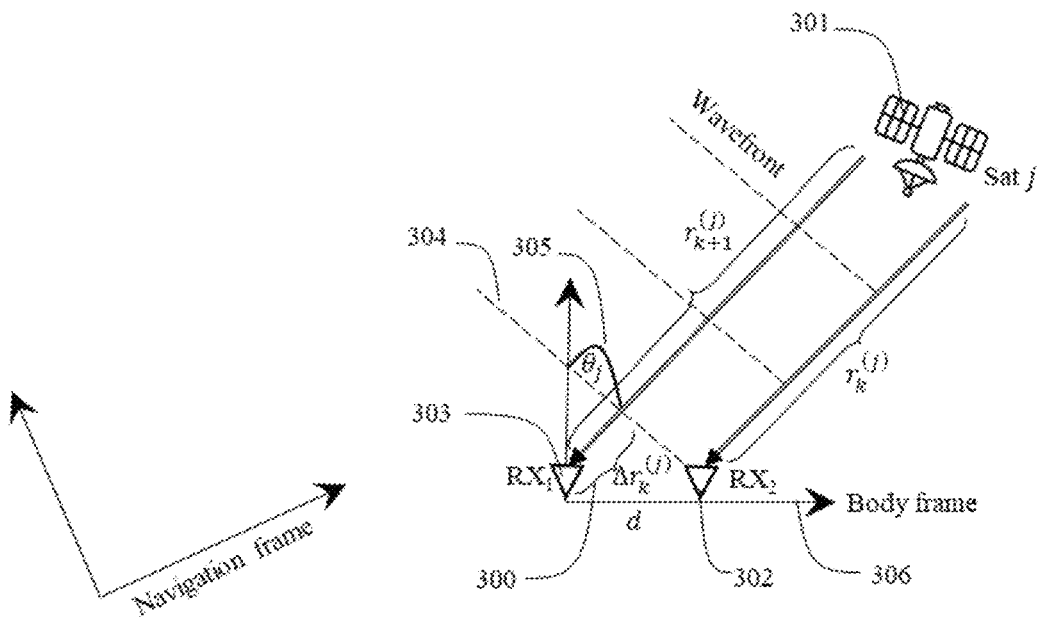
FIG. 3: Coherent phase processing of the GNSS signal in the simple example with 2 receivers in 2D space

Referring to FIG. 3, and using (15) the observed phase differences $\Delta\phi_k^{(j)}$ can be interpreted as the noised version of the differential range Ark 300 normalized by the wavelength.

Provided that a GNSS receiver is deep into the Fraunhofer region (a.k.a. far-field) of a GNSS satellite, the EM wave emanating from the satellite 301 always arrives at the receivers 302 and 303 with a planar wavefront 304. This implies that we can obtain the look angle 305 of the GNSS satellite 301 as seen from the perspective of the receiving platform. The look angle 305, in this case, is the angle-of-arrival (AoA) of the GNSS signal obtained from the differential phase measurements $\Delta\phi_k^{(j)}$ in (15). For the simplified case where there are only two receivers, the space is 2D, and the AoA of a jth satellite signal in the body frame 306 is denoted by $\theta_j$ 305 in FIG. 3, then it is simple to show that $\Delta r_k^{(j)} = d \cdot \sin \theta_j$ 300 which yields $\Delta\phi k(j) = d \cdot \lambda^{-1} \cdot \sin \theta_j + \Delta \in_\phi^{(k,j)}$. This relation suggests that the AoA of the GNSS signal can be obtained from synchronized phase difference and given the knowledge of the geometry of the placement of the receivers.

In the 3D space, there are two AoAs per GNSS satellite j, known as azimuth $\phi_j^b$ and zenith $\theta_j^b$. These angles are defined w.r.t the antenna array's reference frame, which if aligned with the platform (body)'s reference frame b to which the array is strapped down, results in these angles finding meaning in the body frame. This is the reason we superscript these angles by b. Using these AoAs, a unique vector can be established in the body frame b as given by $$y_j^b = (\sin \theta_j^b \cos \phi_j^b, \sin \theta_j^b \sin \phi_j^b, \cos \theta_j^b)^T \quad (16)$$

We denote the vector $y_j^b$ as the pointing vector because it is the vector that extends from platform pointing towards the jth satellite. The representation of the pointing vector in the navigation frame can simply be obtained if the locations $x_k^n$ and $x_j^n$ of the platform and the satellite, respectively, are given in the navigation frame:

$$y_j^n = x_j^n - x_k^n \quad (17)$$

The pair $y_j = [y_j^b, y_j^n]$ for jth satellite is one vector pair that are needed to be able estimate orientation of the platform as shown by (1). Since there is more than one satellite in the sky (J>1), then it is guaranteed that orientation can be estimated unambiguously with J'>2 vector pair $y_1, \ldots, y_{J'}$.

Comparing the proposed approach with that of RTK, one can see a clear distinction:

1. The multi-receiver RTK (needed for orientation estimation) relies on processing phase measurements collected across multiple receivers asynchronously as show by 400 in FIG. 4 Since the phase measurements are contaminated by slowly varying errors of additive nature, they are passed through a high-pass-filter, a process that is practically realized by differencing the signal across different dimensions. The consequence of this filtering is the inevitable introduction of the baseline vector extending from one receiver to the other as the vector of interest to be estimated. The reliability of the baseline vector as the source of orientation information crucially depends on the magnitude of this vector. The magnitude of this vector is constrained by how far the two receivers are placed from each other. Since the receivers are to be tightly integrated inside a small chipset, the only way left is to place antennas far from each other to be able to guarantee sufficient distance between their phase centers. In most specifications, this distance is required to be at least tens of centimeters to meters. This constraint is a huge hindrance towards the practicability of multi-receiver RTK for numerous applications where the form-factor of the platform, which orientation is to be estimated, does not allow such wide-spanned placement of antennas. The placement of a GNSS antenna far from its receiver has another ramification; GNSS signal is so weak that it often cannot afford propagating through a meter long cable running between the non-collocated antenna and receiver. This means that noise floor will have to be set at the location of the antenna using active antennas that have quality electronics, such as low-noise amplifiers, a solution that is bulky and expensive. Additionally, a significant amount of calibration effort is needed to make sure that antenna phase centers are properly calculated, cable length running between receiver and antennas is compensated for when measuring range to satellites, and the direction of the baseline vector in body frame of reference is accurately known. All these aside, it is the inescapable problem of having to deal with integer ambiguities that stands above all imposing long re-acquisition intervals every time that phase lock is lost. This makes multi-receiver RTK a solution that suffers from low availability when operating in urban and sub-urban areas where the "open-sky" assumption is violated. In fact, such assumption may not even be completely valid in rural areas such as mountainous regions. All this domino effect ensued because multi-receiver RTK is built based on a convoluted methodology, that is, to leverage phase difference measurements to infer something about distance.

Figure 4:
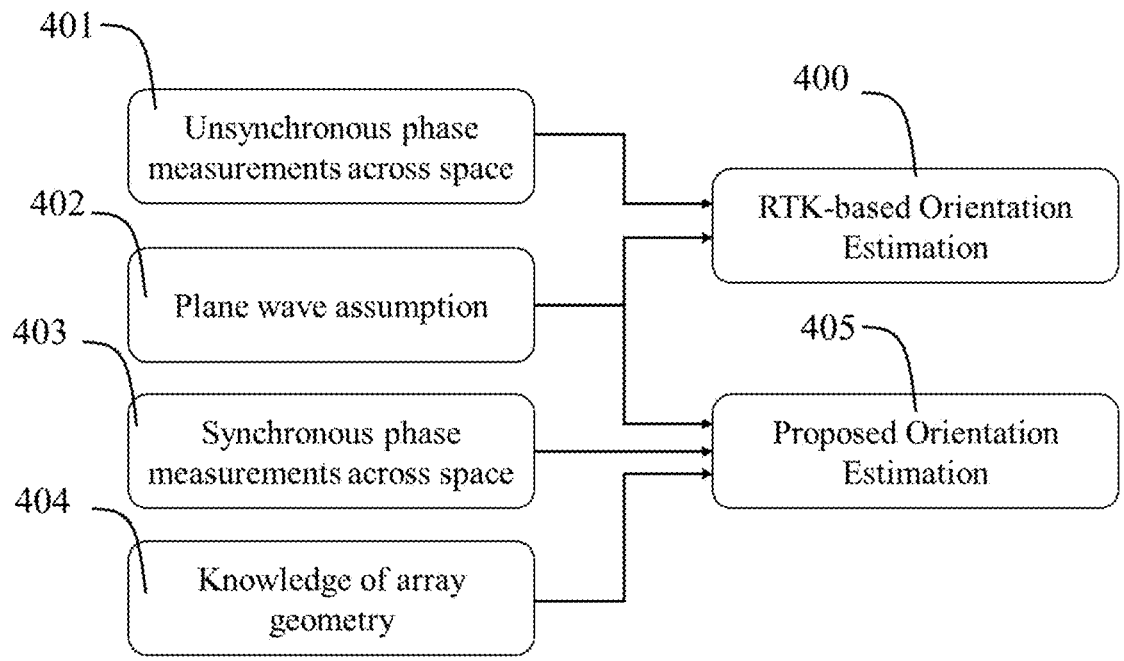
FIG. 4: The difference of methodology between the state-of-the art RTK and the proposed approach in this invention.

2. One of the embodiments of this invention relies on coherent sampling of GNSS signals and calculating phase difference across space as shown by 403. This directly circumvents the roadblock of having to deal with integer ambiguity. As a consequence, no lengthy acquisition/re-acquisition time is imposed on the algorithm. By exploiting the knowledge of the geometry 404 of placement of receivers w.r.t each other, the AoA of incoming waves can be estimated and be used to establish as many pointing vectors as there are satellites. With the inter-receiver distance being only a small fraction of the wavelength of incoming signal, the proposed approach is feasible for many use-cases for which multi-receiver RTK is a deemed a bulky solution. The distinction between the two approaches 400 and 405 is shown in FIG. 4. All these gains and simplicities ensued from the fact the phase difference measurements are used to infer something about angles rather than distance as it is inherently expected to be the case.

Multi-Platform Orientation Estimation

A shortcoming of pose estimation with RF modality lies in the fact that the signal emanating from the anchors (a.k.a. landmarks or reference points) can not be detected when the paths between the receiver and the anchors are shadowed. In such situations, the power of the signal received from the anchor may become buried under the noise floor of the receiver making it impossible to extract reliable phase measurements from samples collected at the receiver. Another complication that might arise is due to the combination of shadowing and multipath. When the receiver is surrounded with reflective objects, the anchor signal bounces off those objects resulting in many rays arriving at the receiver from different directions. This is called multipath. The multipath is often not a problem if the ray propagating along the direct path is not shadowed, a situation called line-of-sight (LoS). However, in the presence of shadowing, one or more of the rays arriving along indirect paths become dominant. This results in a phenomenon called non-line-of-sight (NLoS). If not detected, NLoS can be detrimental to orientation estimation.

When moving in a cluttered environment, there is often no guarantee that a receiver can have LoS to enough anchors to estimate its orientation. On occasions, a blockage is partial, hence, the platform can detect signals from anchors that are LoS, e.g., when the platform is moving in downtown area with tall buildings. However, there are also occasions where the platform may be so heavily blocked by the objects that it can not receive any signal from any anchors, e.g., when the platform is a car inside a tunnel. Without sufficient number of anchors, the platform can only estimate its orientation by integrating its gyroscope reading, a process called dead-reckoning, which suffers from accumulative error due to non-zero and time-varying gyroscope bias as well as noise.

Figure 5:
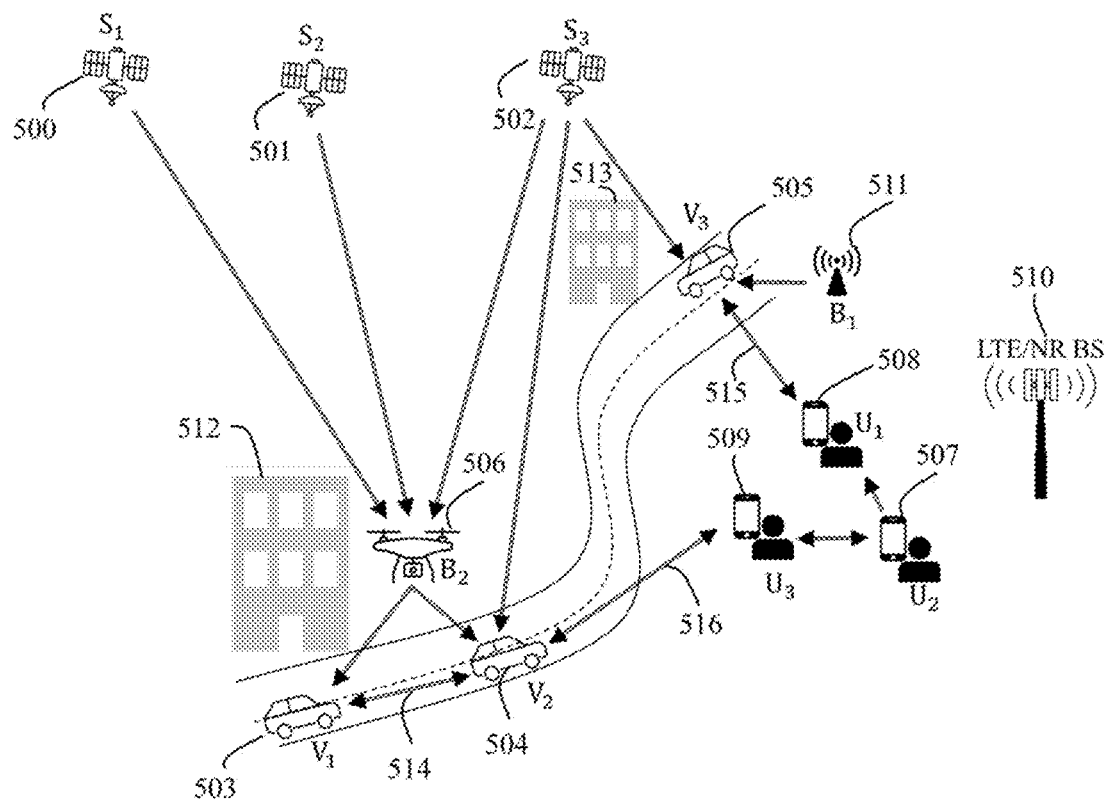
FIG. 5: Multi-platform orientation estimation

Motivated by this shortcoming, this invention reveals working details of an approach that enable joint orientation estimation of an ecosystem of platforms. In this disclosure, the anchor points are not necessarily GNSS satellites, but they can be any reference points which locations are known with high accuracy. This is better illustrated in FIG. 5. In this figure, vehicle $V_1$ 503 is in NLoS with the satellites 500, 501, 502 because it is shadowed by a building 512. However, there is a drone $B_2$ 506 above head whose location fix can be accurately obtained from satellites 500,501,502 due to the pure single-path LoS paths with those satellites. That makes drone 506 a proxy anchor point. As mobile vehicle $V_2$ 504 has a LoS links with drone 506 and satellite 502, it can unambiguously estimate its orientation using (1) estimating AoAs to 506 and 502, (2) the locations of 506 and 502, and (3) its own estimated location. The proxy reference point 506 $B_2$ is LoS with vehicle 503 $V_1$, hence it can transmit a RS to assist vehicle 503 $V_1$ estimate its AoA. Knowing that vehicle 504 $V_2$ was just able to estimate its orientation, it can act as the second proxy reference point for vehicle 503 $V_1$. This is made possible by the presence of a LoS sidelink 514 between vehicle 503 $V_1$ and 504 $V_2$ over which two RSs are bi-directionally exchanged by each party to enable the other party to estimate its AoA. Like before, with two vectors, vehicle 503 $V_1$ is now able to estimate its orientation.

There is a third vehicle 505 $V_3$ that is only able to receive signals from one GNSS satellite 502. However, this vehicle is in the proximity of a fixed roadside infrastructure 511 $B_1$ which location is always fixed and is capable of sending RSs, critical traffic information, and its location. Therefore, 511 acts as yet another proxy reference point for the ecosystem of mobile platforms in this scenario. Once, again, with two vectors, the vehicle 505 $V_3$ can obtain its orientation. This information is subsequently propagated to handheld LTE/NR devices 508 $U_1$, 507 $U_2$, and 509 $U_3$ through sidelink 515. This constitutes one vector. With another positional evidence coming from the vehicle 504 $V_2$ through a different sidelink 516, sufficient evidence is collected to estimate the orientations of handheld devices 507, 508, and 509.

This framework is general enough to embrace some existing solutions. Let's assume that the vehicles 503 $V_1$ and 504 $V_2$ always have the same orientations. For instance, this situation happens when, relative to the curvature of the road, the two vehicles 503 and 504 are close to each other. When the two bodies maintain the same orientations, the vector $y_{1,2}$ obtained between the two vehicles is similar to the baseline vector that RTK receiver delivers. However, the advantage is that, compared to the RTK baseline vector which can not be arbitrarily long due to form factor considerations, the vector $y_{1,2}$ can be long, perhaps in the order of tens of meters. Provided that the length of this vector (as well as RTK baseline) directly impacts the accuracy of heading estimation, this configuration is in a huge advantage compared to RTK in terms of obtaining an orientation estimation with possibly hundredth of degrees accuracy.

The underlying idea behind the joint orientation estimation approach is in multiple fronts:
1. Coherently processing the phase of the received RSs across space to estimate the look angles of the signals
2. Binding of platforms through sidelink angulation
3. Leveraging platforms of different modalities and use-cases to increase the dimension of the ecosystem to tackle the shadowing, NLoS, etc.

DETAILED DESCRIPTION OF THE INVENTION

The making and using of embodiments of this disclosure are discussed below, in detail. It should be appreciated that the present invention delivers many applicable inventive concepts that can be embodied in a wide variety of specific contexts. The specific embodiments discussed are only illustrative of specific ways to make and use the invention, and do not limit the scope of the invention whatsoever. It should be appreciated that most of this disclosure describes the inventive aspects of orientation estimation for a single mobile platform using GNSS satellite signal, but that the disclosed inventive aspects can easily be extended to groups of more than one user and when the anchor points are not necessarily the GNSS satellites.

Theoretical Analysis

As mentioned earlier, estimating the AoAs between platforms and anchors over plurality of links using coherent phase processing is the core novelty behind the orientation estimation idea in this invention. Since one of the embodiments in this invention is related to using GNSS signal as reference points, we elaborate in the following the exact details of how it is possible to use GNSS signals to estimate AoA using an array of antenna with a smaller number of receivers than there are satellites. Without loss of generality, we only focus on GPS signal processing.

Range Estimation with GPS Signal

The signal generated in the baseband by a GPS satellite, indexed j, can be written in the following form $$s_j(t) = \sum_{m=0}^{M-1} d_{m,j} \sum_{l=0}^{L-1} \sum_{n=0}^{N-1} x_{n,j} P(t - nT_c - lNT_c - mLNT_c) \tag{18}$$

This equation is very generic, and it shows how the GPS data symbols, denoted by $d_{m,j}$, are merged with acquisition sequences $\{x_{n,j}, n=0 \cdots N-1\}$, which are pseudo-random noise (PRN) sequences, to enable the receiver to disentangle signals received from multiplicity of satellites. Each PRN sequence $\{x_{n,j}\}_n$ occupies a bandwidth of 2 MHz and has the length of N=1023 chips. The duration of each chip is $T_c=1$ µs, hence the duration of one sequence is $NT_c=1$ ms. In fact, if we show the acquisition sequence of jth satellite by $$z_j(t) = \sum_{n=0}^{N-1} x_{n,j} P(t - nT_c) \tag{19}$$

where $P(t-nT_c)$ is the baseband GPS signal pulse (often modeled as rectangular pulse) of width $T_c$ second centered at $t=nT_c$ that modulates consecutive acquisition symbol $x_{n,j}$. Given (19), signal $s_j(t)$ in (18) can be more compactly represented by $$s_j(t) = \sum_{m=0}^{M-1} d_{m,j} \sum_{l=0}^{L-1} z_j(t - lNT_c - mLNT_c) \tag{20}$$

From the above equation, each sequence is repeated $L=20$ times without any gap in between the consecutive repetitions. Then the series of L sequences are multiplied by the mth navigation data $d_{m,j}$. This means that the duration of one navigation symbol is $LNT_c=20$ ms which implies that the navigation data rate is 50 bps. For jth GPS satellite to transmit the whole navigation frame, M navigation data symbols are to be sent. These navigation symbols are in BPSK format, meaning $d_{m,j} \in \{\pm 1\}$. Each satellite has a unique acquisition sequence $\{x_{n,j}\}_n$ with certain autocorrelation and cross-correlation properties. This is to make sure that the receiver can separate signals from satellites that are superimposed when they are induced at the antenna. One should note that t in (20) is not the true time t, but the local time, denoted by $T_j(t)$.

Therefore, the transmit signal is given by $$s_j(T_j(t)) = \sum_{m=0}^{M-1} d_{m,j} \sum_{l=0}^{L-1} z_j(T_j(t - lNT_c - mLNT_c)) \tag{21}$$

However, we do not deal with this lack of knowledge about universe-time t at this moment and account for this when we estimate observations. The signal in (18) is the baseband signal after the digital to analog conversion (DAC). Without losing generality, we restrict our notation to that of analog signals in this disclosure as analog representation allows us to proceed with our analytical derivations. Having said that, the baseband analog signal (18) should be upconverted to the right frequency that is dedicated for GPS, meaning L1, L2, or L5 frequencies. Let us denote the center frequency in the passband by $f_0$. The way up-conversion happens is by using a mixer that simply multiplies the baseband signal with the pure tone signal that is generated by the local oscillator onboard the satellite. Idealistically, the local oscillator's signal is $$m_j(t) = \cos(2\pi i f_0 t + \theta_j) \tag{22}$$

where $\theta_j$ is a random phase of the generated tone signal. Therefore, the signal at the output of the mixer is going to be $$x_j(t) = s_j(t) \cdot m_j(t) = s_j(t) \cos(2\pi i f_0 t + \theta_j) \tag{23}$$

The signal $x_j(t)$ passes through a power amplifier to add in the gain that is required to be able to get this signal to the receiver on the earth with sufficient signal to noise ratio (SNR). Denoting this power with $\mathcal{P}_j$, the transmit signal at the satellite antenna will be $$x_j(t) = \sqrt{\mathcal{P}_j} \, s_j(t) \cos(2\pi i f_0 t + \theta_j)$$

This signal propagates through the space, passing through free-space and layers of atmosphere reaching the receiver on earth. The propagation effect on the signal can accurately be modeled by an attenuation $\beta_j$ of amplitude of the signal, delay $\tau_j$, and Doppler frequency shift $f_j$. Since there is often no object along the path of the GPS satellite and the receiver, the channel can reasonably be modeled as an additive white Gaussian noise (AWGN) channel. In reality, multipath exists due to reflections off of objects on the surface of earth in the proximity of the receiver. But we will selectively ignore that for now to simplify the derivations. Denoting the received signal by $y_j(t)$, $$y_j(t) = \beta_j s_j(t - \tau_j) \cos(2\pi i (f_0 + f_j)(t - \tau_j) + \theta_j) \tag{25}$$

$$y_j(t) = \sqrt{\mathcal{P}_j} \, \beta_j \sum_{m=0}^{M-1} d_{m,j}$$

$$\sum_{l=0}^{L-1} \sum_{n=0}^{N-1} x_{n,j} P(t - \tau_j - nT_c - lNT_c - mLNT_c) \cdot \cos(2\pi i (f_0 + f_j)(t - \tau_j) + \theta_j)$$

This signal is induced on the antenna port of the receiver. In fact, there are more than one GPS satellite that constantly transmit their signals towards the earth. Moreover, there is an additive noise term that is the combination of the cosmic noise, the thermal noise of the receiver, and the intentional/unintentional interferences that superimpose with the received signals. All in all, the more realistic model of the received signal after the low-noise amplifier (LNA) in the receiver chain can be shown to be $$y(t) = \gamma \sum_{j=1}^{J} y_j(t) + n(t) \rightarrow y(t) = \tag{26}$$

$$\gamma \sum_{j=1}^{J} \sqrt{\mathcal{P}_j} \, \beta_j \sum_{m=0}^{M-1} d_{m,j} \sum_{l=0}^{L-1} \sum_{n=0}^{N-1} x_{n,j} P(t - \tau_j - nT_c - lNT_c - mLNT_c) \cdot$$

$$\cos(2\pi i (f_0 + f_j)(t - \tau_j) + \theta_j) + n(t)$$

where, $\gamma$ is the receiver amplifier gain and J is the number of satellites. This signal is still in passband. For the receiver to be able to process it, it has to downconverted to the baseband. The down-conversion to the baseband in the GPS receiver happens in two stages, where the signal is first brought down to an intermediate frequency and then the second down-conversion kicks in to transport the signal to the baseband domain. This is called heterodyne architecture and is adopted for GPS due to its desirable properties in terms of image rejection, etc. One way or the other, the signal model at the output of heterodyne or homodyne down-conversion is the same (only with different noise/interference level) and is given by $$r(t) = y(t) \exp(-i(2\pi f'_0 t + \theta^{rec})) \tag{27}$$

This is accomplished by mixing the signal with two pure tones $\cos(2\pi f'_0 t + \theta^{rec})$ and $\sin(2\pi f'_0 t + \theta^{rec})$ on I and Q streams of the receiver. Mathematically, the receiver output after mixing with I/Q tones can be represented by the complex representation in (27) as this is a more compact way of working with these signals. Note that the oscillator at the receiver generating the central frequency can never precisely generate the frequency of the transmit signal. It knows which frequency it has to generate, namely, $f_0$. Hence it generates signal $f'_0$ which is different from $f_0$ by $\Delta f_0 = f_0 - f'_0$, a.k.a. the carrier frequency offset (CFO). There is also a phase rotation $\theta_r$ on the generated tone which inevitably exists. After mixing and low-pass filtering the high-frequency components of the signal, we get $$r(t) = \gamma \sum_{j=1}^{J} \left\{ \frac{\sqrt{P_j} \beta_j}{2} \sum_{m=0}^{M-1} d_{m,j} \sum_{l=0}^{L-1} z_j(t - \tau_j - lNT_c - mLNT_c) \right\} \quad (28)$$

$$e^{i(2\pi(\Delta f_0 + f_j)t)} \cdot e^{i(-2\pi f_0 \tau_j + \Delta \theta_j)} + n(t)$$

where this signal is now complex. Note that we used the more compact representation (20) in (28). We denoted the phase difference by $\Delta \theta_j = \theta_j - \theta^{rec}$; this is called carrier phase offset (CPO). The term $\exp(2\pi(\Delta f_0 + f_j)t)$ is the effect of doppler shift and the CFO which can not be disentangled from each other so easily. Note that the noise gets modified after being downconverted and filtered. But we still represent it with n(t) in (28) as its statistics will not change after being passed through mixer.

The first task of the GPS receiver is to separate the signals coming from different satellites. Therefore, the receiver uses the cross-correlation property of the acquisition sequences that modulate the transmit symbols, which is $$z_j(t) * z_r(-t) = \begin{cases} 0 & j \neq r \\ 1 & j = r \end{cases} \quad (29)$$

to be able to separate the signals. Here * is the convolution operation. In practice, this happens by matched filtering the received signal with J locally generated version of $z_r(t)$, $r=1 \cdots J$, given in (19), each corresponding to one satellite. Let's denote the output of the rth matched filter by $u_r(t)$. Then, $$u_r(t) = r(t) * z_r(-t)$$

$$u_r(t) = u_1(t) + n'(t) + \mathcal{J}(t) \quad (30)$$

where $$u_1(t) = \hat{\gamma}_r \sum_{m=0}^{M-1} d_{m,r} \sum_{l=0}^{L-1} R_c(t - t_{r,l,m}) \quad (31)$$

$$n'(t) = n(t) * z_r(-t)$$

$$\mathcal{J}(t) = \sum_{\substack{j=1 \\ j \neq r}}^{J} \{\ldots\} * z_r(-t)$$

The first term $u_1(t)$ is the component of interest in the signal which is a train of ML triangular functions $R_c(t-t_{r,l,m})$ each shifted by $t_{r,l,m} = \tau_r + T_c(lN+mLN)$ whose amplitude depends on the navigation data $d_{m,r} \in \{\pm 1\}$ and another factor $\hat{\gamma}_r$ which is given by $$\hat{\gamma}_r = \frac{\gamma \sqrt{P_r} \beta_r}{2} \exp(i(-2\pi f_0 \tau_r + \Delta \theta_j)) \quad (32)$$

The second term $n'(t)$ in (30) is the contribution of system noise at the output of the matched filter. The final term $\mathcal{J}(t)$ is the (a) cross-interference from other satellites, indexed $j \neq r$ and (b) self-interference of the rth satellite caused by multipath. Specifically, $\mathcal{J}(t)$ exists because (29) is only an idealistic model. In fact, neither are the PRN sequences of different satellites completely orthogonal to each other nor the shifted versions of the same PRN sequences are orthogonal.

Function $R_c(\bullet)$ in (31) is given by $$R_c(t) = p(t) * p(-t) \quad (33)$$

where, p(t) is the shaping pulse applied at the transmitter. When shaping pulse is a rectangular pulse, that is $p(t) = \Pi(t)$, of width $T_c$ (chirp duration), then $R_c(t) = \Lambda(t)$ is a triangular pulse of width $2T_c$. However, if a more moderate time-domain transition (which is desirable from implementation perspective) is adopted (such as a raised cosine pulse), then $R_c(t)$ will be of slightly different shape. However, $R_c(t)$ will still have a sharp peak, a property that is crucial for acquisition.

So far, we were able to create a signal for each satellite, denoted by $u_r(t)$ in (30). This signal carries information from rth satellite. Since, for the sake of pose estimation, a handful of measurements from multiple satellites are needed, we have to conduct (30) multiple times (in parallel) each time with the acquisition sequences of a unique satellite. However, because the receiver does not know (prior to acquisition) which satellite is in view and which one is not, it has to correlate the received signal with all existing satellite PRN sequences.

To acquire a signal, the receiver calculates $u_r(t)$ and finds the first peak of this function. It was explained earlier that the peaks of this function happen at $t_{r,l,m} = \tau_r + T_c(lN+mLN)$ repeating every $T_c N$ seconds. If there was no noise and interference, the first peak of the function $u_r(t)$ gives the apparent range to the satellite. However, in reality, noise and interference exits, which after adding to the signal, cause the peak to shift from its true time.

AoA Estimation with GPS Signal

Now assume that we have an array of GPS receivers. The signal received at the kth antenna is the same as (28) except for the fact that the times that take the jth satellite signal to reach different antennas are slightly different. Denoting this propagation delay by $\tau_j^{(k)}$, the received signal from the jth satellite is given by $$y_j^{(k)}(t) = \beta_j s_j(t - \tau_j^{(k)}) \cos(2\pi i (f_0 + f_j)(t - \tau_j^{(k)}) + \theta_j) \quad (34)$$

Superimposing the received signals from all satellites, the voltage at the input of the kth receiver is given by $$y_k(t) = \gamma \sum_{j=1}^{J} y_j^{(k)}(t) + n(t) \quad (35)$$

All the mathematical treatment is like before except that we index delay with k. Therefore, we jump forward to adapt (30) as follows $$u_r^k(t) = \frac{\gamma \sqrt{P_\gamma} \beta_\gamma}{2} e^{i\left(-2\pi f_0 \tau_r^{(k)} + \Delta \theta_r\right)} \quad (36)$$

$$\sum_{m=0}^{M-1} d_{m,r} \sum_{l=0}^{L-1} \Lambda\left(t - \left(\tau_r^{(k)} + T_c(lN + mLN)\right)\right) + n'(t) + \mathcal{J}(t)$$

Since the function $u_r^k(t)$ is comprised of non-overlappingly shifted and scaled versions of base function $\Lambda(e)$, it has significant value when one of these triangular functions are non-zero. The latter happens when $e \in [0, 2T_c]$ which implies that $$\tau_r^{(k)} + T_c(lN+mLN) \leq t < \tau_r^{(k)} + T_c(lN+mLN+2) \rightarrow u_r^k(t) >> \epsilon$$

$$\tau_r^{(k)} + T_c(lN+mLN+2) t \leq \tau_r^{(k)} + T_c(lN+mLN+N) \rightarrow u_r^k(t) \approx \epsilon \quad (37)$$

The $\epsilon$ is to reflect that noise and interference always exists to result in $u_r^k(t) \neq 0$ no matter if the signal is available or not. However, they are supposed to be less significant compared to the signal. With this in mind, let's assume we use one of the receivers and find the first peak at the output of its kth correlator. Let's say that the receiver k=1 catches a peak at time $t_0$ $$t_0 = \left( \left\lfloor \frac{\tau_r^{(1)}}{T_c} \right\rfloor + (l'N + m'LN) \right) T_c \quad (38)$$

and keep sampling this signal every $NT_c$ seconds from that moment onwards:

$$t_n = t_0 + nNT_c \quad (39)$$

Note that we used $\lfloor \cdot \rfloor$ in (38) to reflect the fact that the receiver has a limited sampling rate ($R_s=2$Msample/s), hence, it can't estimate $\tau_r^{(k)} + (l'N+m'LN)T_c$ exactly. With that said, the samples from the rth correlator at the remaining receivers $k=2 \cdots J$ at times $t_n$ are given by $$u_r^k(t=t_n) = \frac{\gamma \sqrt{\mathcal{P}_r} \beta_r}{2} e^{j\left(-2\pi f_0 \tau_r^{(k)} + \Delta \theta_r\right)} \quad (40)$$

$$\sum_{m=0}^{M-1} d_{m,r} \sum_{l=0}^{L-1} \Lambda \left( T_c \left( \left\lfloor \frac{\tau_r^{(1)}}{T_c} \right\rfloor - \frac{\tau_r^{(k)}}{T_c} + (l'-l)N + (m'-m) LN + nN \right) \right) +$$

$$n(nT_c) + \mathcal{J}(nT_c)$$

Which is obtained by evaluating (36) at moments $t_n$ using (38) and (39). For k=1, this function has non-zero value when the argument of $\Lambda(\cdot)$ is within the range $(-1,1)$, that is $$-1 < \left\lfloor \frac{\tau_r^{(1)}}{T_c} \right\rfloor - \frac{\tau_r^{(1)}}{T_c} + (l'-l)N + (m'-m) LN + nN < 1 \quad (41)$$

Let us use the identity $n = n^{rem} + n^{mod}$ for the integer n, where $n^{rem} = \text{rem}(n, L)$ and $n^{mod} = \text{mod}(n, L)$ are the remainder and mod of n divided by L, respectively. Then, we can write (41) as $$-1 < \left\lfloor \frac{\tau_r^{(1)}}{T_c} \right\rfloor - \frac{\tau_r^{(1)}}{T_c} + (l'-l+n^{rem})N + \left(m'-m+n^{mod}\right) LN < 1 \quad (42)$$

Knowing that $$-1 < \left\lfloor \frac{\tau_r^{(1)}}{T_c} \right\rfloor - \frac{\tau_r^{(1)}}{T_c} < 0 \quad (43)$$

then, (42) can only be satisfied if $$l' - l + n^{rem} = 0 \rightarrow l = l' + n^{rem}$$

$$m' - m + n^{mod} = 0 \rightarrow m = m' + n^{mod} \quad (44)$$

Therefore, for k=1, the two summations in (40) are zero except for l and m given in (44) yielding $$u_r^1(t=t_n) = \frac{\gamma \sqrt{\mathcal{P}_r} \beta_r d_{m'+n^{mod},r}}{2} e^{j\left(-2\pi f_0 \tau_r^{(1)} + \Delta \theta_r\right)} \Lambda \left( T_c \left( \left\lfloor \frac{\tau_r^{(1)}}{T_c} \right\rfloor - \frac{\tau_r^{(1)}}{T_c} \right) \right) + \quad (45)$$

$$n'(nT_c) + \mathcal{J}(nT_c)$$

To know what the samples $u_r^{k>1}(t=t_n)$ look like, we elaborate further on $\tau_r^{(k)}$. Let's imagine a simple scenario where the satellite and the receiver are in 2D. We also assume that the antennas are placed co-linearly and uniformly where the distance between adjacent antennas is d. For this uniform linear array (ULA), it is accurate to write $$\tau_r^{(k)} = \tau_r^{(1)} + (k-1)\frac{d}{c}\sin\theta_{u,r}^b \quad (46)$$

where $\theta_{u,r}^b$ is the AoA w.r.t the array frame of reference from satellite r to user u. Please keep distinction between $\theta_{u,r}^b$, which now denotes the AoA in body frame, and $\Delta\theta_r$, which was earlier introduced as the CPO.

Assuming that $d=\lambda/2$ (an assumption made to avoid ambiguity when estimating angles with an array of antenna) where $\lambda=c/f_0$ is the wavelength of the carrier frequency and c is the speed of light, then the extra time that the signal has to travel to reach the k receiver is upper bounded as follows $$\Delta \tau_r^{(k)} = \left| \tau_r^{(k)} - \tau_r^{(1)} \right| = \frac{(k-1)}{2f_0} \sin\theta_{u,r}^b < \frac{(k-1)}{2f_0} < \frac{K}{2f_0} = 0.3K \cdot 10^{-9} \quad (47)$$

where the last numerical value is obtained given that $f_0=1575.42$ MHz. Assuming K=10 receivers, the extra time that the signal travels to reach the farthest receiver is 3 ns. This is pretty negligible and is a worse-case scenario analysis. With that in mind, we go back to (40). In that equation, $\Delta\tau_r^{(k)}$ appears in the phase inside the argument of $\Lambda(\cdot)$ function. As for the latter, the difference between the argument of the kth receiver and the first receiver is given by $$\Delta \tau_r^{(k)} < 0.3K \cdot 10^{-9} = 0.3K \cdot 10^{-9} \quad (48)$$

Assuming that $\Lambda$ is a triangular function whose slope is $1/T_c$, the difference between the amplitude of two samples $u_r^1(t=t_n)$ and $u_r^{k>1}(t=t_n)$ is given by $$\left| u_r^k(t=t_n) \right| - \left| u_r^1(t=t_n) \right| = \frac{\gamma \sqrt{\mathcal{P}_r} \beta_r}{2} \left( \frac{\Delta \tau_r^{(k)}}{T_c} \right) < \frac{\Delta \tau_r^{(k)}}{T_c} = 0.3K \cdot 10^{-6} \quad (49)$$

where the last inequality uses the fact that $$\gamma \sqrt{\mathcal{P}_r} \beta_r \ll 1.$$

What the inventors aim to conclude here is that that the GPS signal's wavefront propagating across an array of antenna undergoes a very negligible attenuation which can be completely ignored. In fact, $\beta_r$ has to be also indexed with k because the wave loses energy as it moves (loss is proportional with distance). But because of the sheer closeness of the antennas, such dependence can also be ignored. Therefore, we can still use (45) for k>1

$$u_r^k(n) = u_r^k(t = t_n) = \qquad (50)$$

$$\frac{\gamma\sqrt{\mathcal{P}_r}\beta_r d_{m'+n^{mod},r}}{2} e^{i\left(-2\pi f_0 \tau_r^{(k)} + \Delta\theta_r\right)} \Lambda\left(T_c\left(\left[\frac{\tau_r^{(1)}}{T_c}\right] - \frac{\tau_r^{(k)}}{T_c}\right)\right) +$$

$$n'(nT_c) + \mathcal{J}(nT_c)$$

Leveraging the observation that $$\mathcal{A}_r = \Lambda\left(T_c\left(\left[\frac{\tau_r^{(1)}}{T_c}\right] - \frac{\tau_r^{(k)}}{T_c}\right)\right) \approx \Lambda\left(T_c\left(\left[\frac{\tau_r^{(1)}}{T_c}\right] - \frac{\tau_r^{(1)}}{T_c}\right)\right) \qquad (51)$$

and using (46), (50) simplifies as $$u_r^k(n) = \qquad (52)$$

$$u_r^k(t = t_n) = \left\{\frac{\gamma\sqrt{\mathcal{P}_r}\beta_r d_{m'+n^{mod},r}}{2} \mathcal{A}_r e^{i\left(-2\pi f_0\left(\tau_r^{(1)} + \Delta\theta_r\right)\right)}\right\} e^{\pi i(k-1)\sin\theta_r} +$$

$$n'(nT_c) + \mathcal{J}(nT_c)$$

This is the one of the novelties in the invention: We showed that we can estimate AoA by processing the correlator outputs instead of processing samples before the correlators. There are some estimation algorithms that can take such samples in (52) and deliver AoA. The one that is the simplest is the following:

$$\hat{\theta}_{u,r}^b \approx \sin^{-1}\left(\frac{\angle u_r^{k+1}(t = t_n) \cdot \left(u_r^k(t = t_n)\right)^*}{\pi}\right) \qquad (53)$$

It can be seen from (52) that why all chains will have to be sampled coherently, meaning at the same time and be downconverted with one oscillator. A more advanced solution is to use super-resolution algorithms such as MUSIC, SAGE, ML, etc. For example, the MUSIC algorithm uses the covariance matrix of the observation vector $$u_r(n) = [u_r^1(n) \cdots u_r^K(n)]^T \in \mathbb{C}^{K\times 1} \qquad (54)$$

for each set of observation collected from all antennas at the same time $t_n$. This covariance matrix, denoted by $C_r$, uses $u_r(n)$, $n=1 \cdots \mathcal{T}$ as follows $$C_r = \frac{1}{\mathcal{T}}\left([u_r(1) \cdots u_r(\mathcal{T})] \cdot \begin{bmatrix} u_r(1) \\ \vdots \\ u_r(\mathcal{T}) \end{bmatrix}^H\right) = \frac{1}{\mathcal{T}}\sum_{n=1}^{\mathcal{T}} u_r(n) u_r(n)^H \qquad (55)$$

Note from (55) that to form the covariance matrix, observations across space and time are needed. The larger the K or $\mathcal{T}$ is, the better the estimate of AoA will be. If we cannot afford large number of receivers (due to cost/space considerations), we can still use the time dimension, the cost of which is to wait for longer time to be able to deliver an estimate of AoA. In fact, with the interval between two samples being $NT_c=1$ ms, the receiver needs to wait for $N\mathcal{T}T_c=\mathcal{T}$ ms to find a reliable covariance matrix. For MUSIC super-resolution algorithm to work, $C_r$ is to be decomposed to its eigenvalues and eigenvectors $\mathcal{V}_r$, $\mathcal{G}_{r,r}$ from which the noise subspace eigenvalues and eigenvectors $\mathcal{V}_{r,n}$, $\mathcal{G}_{r,n}$ are derived and used in the following equation to find the value of θ that maximizes this function $$\mathcal{L}(\theta) = \frac{a(\theta)^H a(\theta)}{a(\theta)^H \mathcal{V}_{r,n} \mathcal{V}_{r,n}^H a(\theta)} \qquad (56)$$

$$\hat{\theta}_{u,r}^b = \underset{\theta}{\operatorname{argmax}} \mathcal{L}(\theta)$$

where α(θ) is the array steering vector that depends on the known geometry of the array with K receivers. For a ULA, this is given by $$\alpha(\theta) = [1, e^{\pi i \sin \theta}, \cdots e^{\pi i (K-1)\sin \theta}]^T \in \mathbb{C}^{K\times 1} \qquad (57)$$

In the more general case of 3D space, there are two angles to be estimated, for rth satellite, instead of one, namely, the azimuth $\phi_{u,r}^b$ and zenith $\theta_{u,r}^b$. Note that every angle that is estimated by array signal processing is defined in the array frame which, without loss of generality, is assumed to be aligned to the body frame which orientation w.r.t the navigation frame we are interested in knowing. Let's assume that azimuth $\phi_{u,r}^b$ is the angle subtended between the projection of ray on x-y plane and the x-axis of the body frame and zenith angle $\sigma_{u,r}^b$ being the angle subtended between the ray and the z-axis. In a right-hand coordinate system, this unit-norm vector, called pointing vector, is given by $$e_{\theta_{u,r}^b, \phi_{u,r}^b} = (\sin \theta_{u,r}^b \cos \phi_{u,r}^b, \sin \theta_{u,r}^b \sin \phi_{u,r}^b, \cos \theta_{u,r}^b) \qquad (58)$$

What we mean by the "ray" is the direction of propagation of rth GPS signal. With this convention in mind, the distance between $(k_1, k_2)$th element of the receiver array is related to a reference element $(1,1)$ through the following formula $$\tau_r^{(k_1,k_2)} = \tau_r^{(1,1)} + \frac{1}{c}\langle d_{k_1,k_2}, e_{\theta_{u,r}^b, \phi_{u,r}^b}\rangle \qquad (59)$$

where, $d_{k_1,k_2}$ is the vector connecting the reference element to the $(k_1, k_2)$th element and $\langle \bullet, \bullet \rangle$ is the inner product between two vectors. This is to model the fact that, for a planar wave assumption, we are interested in the size of projection of the $d_{k_1,k_2}$ onto $e_{\theta_{u,r}^b, \phi_{u,r}^b}$ to estimate the distance travelled. For a planar linear array (PLA) that is placed on the x-y plane of the body frame, $$d_{k_1,k_2} = ((k_1-1)d_x, (k_2-1)d_y, 0) \qquad (60)$$

which results in $$\tau_r^{(k_1,k_2)} = \tau_r^{(1,1)} + \frac{1}{c}((k_1-1)d_x \sin\theta_{u,r}^b \cos\phi_{u,r}^b + (k_2-1)d_y \sin\theta_{u,r}^b \sin\phi_{u,r}^b) \qquad (61)$$

Given this, and assuming $d_x = d_y = \lambda/2$ for simplicity, the extension of (52) to the 3D scenario is given by $$u_r^{(k_1,k_2)}(n) = \left\{\frac{\gamma\sqrt{\mathcal{P}_r}\beta_r d_{m'+n^{mod},r}}{2} \mathcal{A}_r e^{i\left(-2\pi f_0\left(\tau_r^{(1,1)} + \Delta\theta_r\right)\right)}\right\} \qquad (62)$$

$$e^{\pi i((k_1-1)\sin\theta_{u,r}^b \cos\phi_{u,r}^b + (k_2-1)\sin\theta_{u,r}^b \sin\phi_{u,r}^b)} + n'(nT_c) + \mathcal{J}(nT_c)$$

$$\hat{\phi}_{u,r}^b = \sin^{-1}\left(\frac{Lu_r^{(k_1,k_2+1)}(n) \cdot \left[u_r^{(k_1,k_2)}(n)\right]^*}{Lu_r^{(k_1+1,k_2)}(n) \cdot \left[u_r^{(k_1,k_2)}(n)\right]^*}\right)$$

and $$\hat{\theta}_{u,r}^b = \sin^{-1}\left(\frac{Lu_r^{(k_1,k_2+1)}(n) \cdot \left[u_r^{(k_1,k_2)}(n)\right]^*}{\sin\hat{\phi}_{u,r}^b}\right) \quad (63)$$

Again, we can do better than (63) as the noise makes the estimates $\hat{\phi}_r$ and $\hat{\theta}_r$ inaccurate. In fact, we can use the MUSIC algorithm in (56) as given by:

$$\mathcal{L}(\theta, \phi) = \frac{a(\theta, \phi)^H a(\theta, \phi)}{a(\theta, \phi)^H \mathcal{V}_{r,n} \mathcal{V}_{r,n}^H a(\theta, \phi)} \quad (64)$$

$$\hat{\theta}_{u,r}^b, \hat{\phi}_{u,r}^b = \underset{\theta,\phi}{\operatorname{argmax}} \mathcal{L}(\theta, \phi)$$

with the only subtle difference that the steering vector is now a function of two variables as follows $$a(\theta,\phi) = [1, e^{\pi i z(\theta,\phi)}, \ldots, e^{\pi i (K_1 K_2 - 1)z(\theta,\phi)}]^T \in \mathbb{C}^{K_2 K_2 \times 1}$$

wherein $$z(\theta,\phi) = (k_1 - 1)\sin\theta\cos\phi + (k_2 - 1)\sin\theta\sin\phi \quad (65)$$

Like the 2D case, the noise-space eigen-vectors $\mathcal{V}_{r,n}$ used in (64) is obtained from (55) where $u_r(n)$ is given by $$u_r(n) = [u_r^1(n) \cdots u_r^{K_1 K_2}(n)]^T \in \mathbb{C}^{K_1 K_2 \times 1} \quad (66)$$

Receiver Implementation

Figure 6:
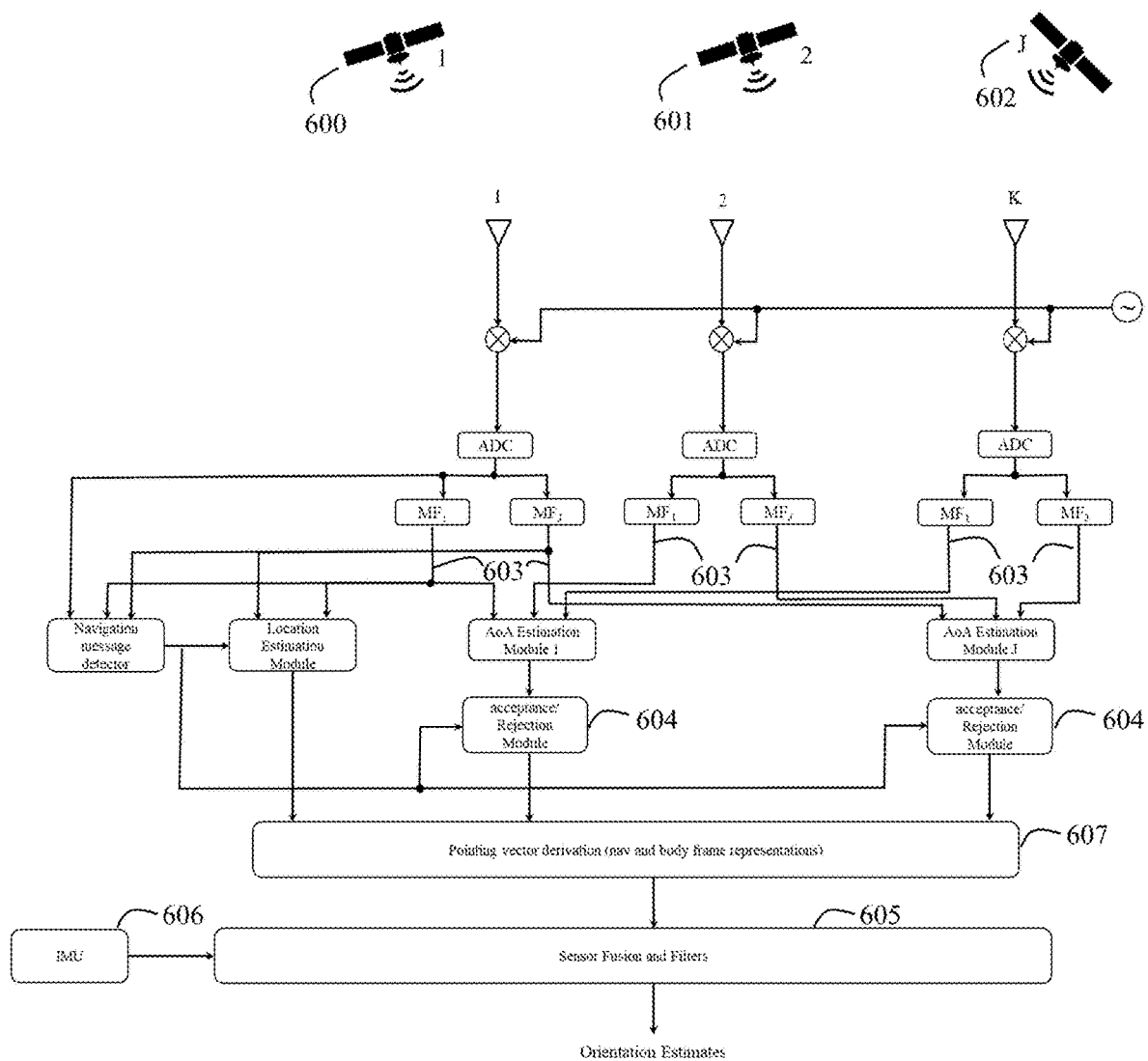
FIG. 6: Receiver architecture for AoA estimation using post-correlator GNSS signals

With the insight obtained from the previous section, FIG. 6 illustrates one of the receiver implementations for the embodiment of this invention where the anchors are GNSS satellites 600, 601, and 602. In this architecture, the post-correlator GNSS signals at the output of correlators 603 are jointly processed to estimate AoA to multiplicity of satellites. The acceptance/rejection module 604 then evaluates and filters these estimates using the statistics of the signal collected across multiple domains to decide which ones are reliable and which ones are outliers. Subsequently, a sensor fusion engine 605 receives the filtered AoA (from multiple satellites) along with IMU measurements 606 to deliver robust and reliable estimation of orientation. The advantage of this architecture is in the fact that it is possible to estimate AoA with much lower number of receivers than there are satellites. Ordinarily, this wouldn't have been possible if we used the pre-correlator samples. However, because correlation disentangle satellites from each other in the code domain, then its theoretically possible to only use 3 receivers to estimate the orientation of the platform in 3D space. The architecture in FIG. 6 may also be used for the more general case of multi platform orientation estimation using GNSS satellites.

Estimating Orientation from AoAs

Having AoAs estimations at hand, the objective is to jointly process them to estimate the orientation of one or more platforms. Next, we delineate an embodiment on how these orientation estimates can be obtained.

Single-Platform Orientation Estimation

In this section, we provide details of an embodiment algorithm that can solve the single-platform orientation estimation problem using AoA measurements obtained from multiple GNSS satellites. Two solutions are investigated.

Constrained Optimization Problem

The goal is to estimate the orientation from AoA estimates $(\beta_j^b, \phi_j^b)$, $\forall j$. Considering that these AoA estimates are noisy in nature, the body-frame pointing vector $y_j^b$, as given in (16), is going to be different from the vector $\bar{y}_j^b$, which is the ground truth pointing vector connecting platform to the satellite (in body frame). Moreover, because the location of the satellite j and the platform are not precisely known, the vectors $y_j^n$, as given in (17), will also be different from the Vector $\bar{y}_j^n$, which is the ground truth pointing vector connecting platform to the satellite (in navigation frame). All of these render the problem to an optimization problem where the objective is to choose the rotation matrix $R^{bn}$ so as to minimize the magnitude of the estimation noise vector N in the following formulation $$\frac{[y_1^b \cdots y_J^b]}{Y^b} = R^{bn} \cdot \frac{[y_1^n \cdots y_J^n]}{Y^n} + N \quad (67)$$

Looking at this problem probabilistically, we would like to maximize the likelihood of the observation matrices $Y^b$ and $Y^n$ given the model in (67)

$$\max_{R^{bn}} f(Y|R^{bn}) = f(Y^b, Y^n | R^{bn}) \quad (68)$$

Alternatively, one can maximize the posterior $f(R^{bn}|Y)$ instead of the likelihood if one has some prior knowledge on the a-priori distribution of $R^{bn}$. For the sake of exposition, we take the likelihood approach in this embodiment. In practice, the angle estimates of arriving signals from different satellites are independent from each other. As a result, the columns of the noise matrix $N = [n_1 \cdots n_J]$ can be treated as being independent, yielding $$\max_{R^{bn}} f(Y|R^{bn}) = \prod_{j=1}^{J} f(y_j^b, y_j^n | R^{bn}) \quad (69)$$

Assuming that noise vector $n_j$ has Gaussian distribution $n_j \sim \mathcal{N}(0, Q_j)$, which is a reasonable assumption in most scenarios, (69) turns into a least square problem of the following form $$\min_{R^{bn}} \sum_{j=1}^{J} (y_j^b - R^{bn} y_j^n)^T Q_j^{-1} (y_j^b - R^{bn} y_j^n) \text{ subject to } R^{bn}(R^{bn})^T = I \quad (70)$$

To proceed further, let's assume that the covariance matrices $Q_j = I$, $\forall j = 1 \cdots J$. This results in $$\min_{R^{bn}} \sum_{j=1}^{J} |y_j^b - R^{bn} y_j^n|_2^2 = |Y^b - R^{bn} Y^n|_{Fro}^2 \text{ subject to } R^{bn}(R^{bn})^T = I \quad (71)$$

where $|\cdot|_{Fro}$ and $|\cdot|_2$ are the Frobenius norm and norm-2 operators, respectively. It can be shown that the answer to (71) is given by the following closed-form formula $$\hat{R}^{bn} = VU^T \quad (72)$$

where V and U are the right and left singular vectors of the matrix $Z=Y^n(Y^b)^T$. The existence of a closed-form solution for (71) indicates the global optimality of (72). The inventors also contrived a general solution for (70) where the covariance matrices $Q_j$ are not necessarily identity, diagonal, or equal to each other.

Unconstrained Optimization Problem

An alternative solution to (67) is obtained by relaxing the problem from the constrain $R^{bn}(R^{bn})^T=$.

As one embodiment of this invention, the inventors detail the solution when only two observation vectors are available, that is, J=2. In this case, we can use $y_1^{b/n}$ and $y_2^{b/n}$ to form an orthogonal vector $y_{1\times 2}^{b/n} = y_1^{b/n} \times y_2^{b/n}$ using cross product (in a right-hand coordinate system). We then use $y_1^{b/n}$ and this new vector $y_{1\times 2}^{b/n}$ to form a third vector $y_\perp^{b/n} = y_1^{b/n} \times y_{1\times 2}^{b/n}$. Vectors $y_1^b$, $y_{1\times 2}^b$, and $y_\perp^b$ form a triad as do the vectors $y_1^n$, $y_{1\times 2}^n$, and $y_\perp^n$. Therefore, they can be used to solve the following relaxed optimization problem $$[y_1^b, y_{1\times 2}^b, y_\perp^b] = R^{bn}[y_1^n, y_{1\times 2}^n, y_\perp^n] \quad (73)$$

The solution to this problem is given by $$\hat{R}^{bn} = [y_1^b, y_{1\times 2}^b, y_\perp^b] \cdot [y_1^n, y_{1\times 2}^n, y_\perp^n]^{-1} \quad (74)$$

Multi-Platform Orientation Estimation

When moving in a cluttered environment, there is often no guarantee that a receiver can have LoS to enough anchors to estimate its orientation. On occasions, a blockage is partial, hence, the platform can detect signals from some anchors w.r.t which the platform experiences LoS. However, there are also occasions where the platform may not even see a single anchor's signal such as when the platform is (mounted on) a car inside a tunnel. Without sufficient number of anchors, the platform can only estimate its orientation by integrating its gyroscope reading, a process that suffers from accumulative error due to non-zero and time-varying gyroscope bias.

Figure 7:
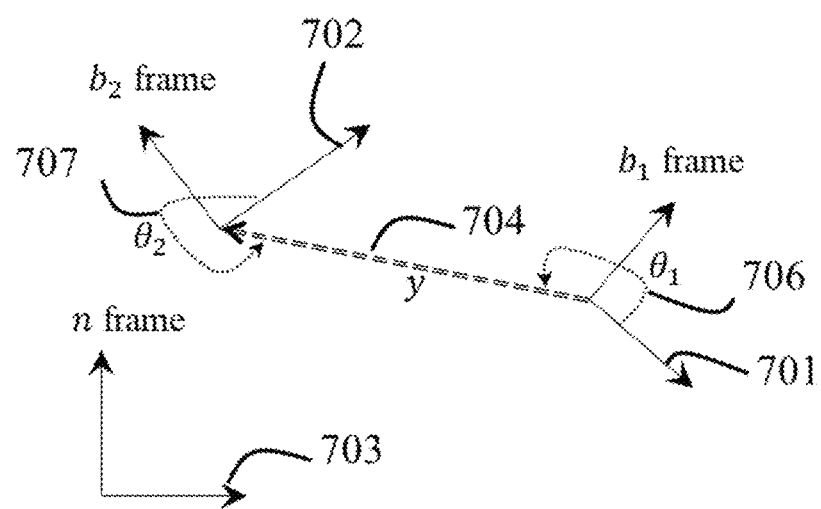
FIG. 7: two local reference frames orientated differently with respect to the navigation frame

Let's now assume the scenario in FIG. 7 which shows two local (body) reference frames $b_1$ 701 and $b_2$ 702 which are orientated differently with respect to the navigation frame n 703. A vector y 704 is extended from the origin of frame $b_1$ 701 to the origin of frame $b_2$ 702. This vector makes angles $\theta_1$ 706 and $\theta_2$ 707 w.r.t x-axes of frame $b_1$ 701 and $b_2$ 702, respectively. What this means is that vector y 704 has the following representations in the two local reference frames $$y^{b_1} = [\cos \theta_1, \sin \theta_1]$$

$$y^{b_2} = [\cos \theta_2, \sin \theta_2] \quad (75)$$

Provided that the two vectors are alternative representations in two separate frames, one can write $$y^{b_1} = R^{b_1 b_2} y^{b_2} \quad (76)$$

where $R^{b_1 b_2} \in \mathbb{R}^{2\times 2}$ is the rotation matrix that rotates vector y in the body frame two to the body frame one. Owing to the multiplicative chain rule on rotation matrices, one can write (76) as two tandem rotations, where vector $y^{b_2}$ is first carried from body frame 2 to the navigation frame n by matrix $R^{nb_2}$ and the result is then transported to the navigation frame one through matrix $R^{b_1 n}$:

$$y_{b_1} = R^{b_1 n} R^{nb_2} y^{b_2} \quad (77)$$

Due to the symmetric property of rotation matrices, that is, $R^{x,y} = (R^{y,x})^T$, where $(\bullet)^T$ is matrix transpose operation, (77) can be written as:

$$y^{b_1} = R^{b_1 n} (R^{b_2 n})^T y^{b_2} \quad (78)$$

Equation (78) immediately reveals that knowing angles $\theta_1$ and $\theta_2$, one can obtain a relationship between the unknown rotation matrices $R^{b_1 n}$ and $R^{b_2 n}$ within which the unknown Euler angles (orientations) lie. As we will see later, constraints of the form (78) are useful when solving orientation estimation problems, especially when not sufficiently accurate estimates (if any) can be attained by processing local measurements, for instance, when there is shadowing and NLoS.

Assuming that the vector y is direction of the propagation of an EM wave travelling between a transmitter and a receiver, the angles $\theta_1$ and $\theta_2$ have an interesting interpretation with practical values: They are known as look angles, which are also called angles of departure (AoD) and AoA of the EM wave propagating between the transmitter and the receiver, respectively. These angles can independently (or jointly) be estimated with two arrays of antennas mounted on both sides and processing the phase differences of the reference signals (modulating the EM carrier) transmitted by one and received by the other.

Another possibility to achieve the same equation as (78) is to exchange two reference signals in opposite directions of each other between the two platforms and only estimate the AoA based on the received signal on each direction. This approach is valid due to the reciprocity of the channel. The above discussion on using EM wave is only one embodiment of this approach as other remote sensing modalities can also be envisioned to yield the same relationship.

Figure 8:
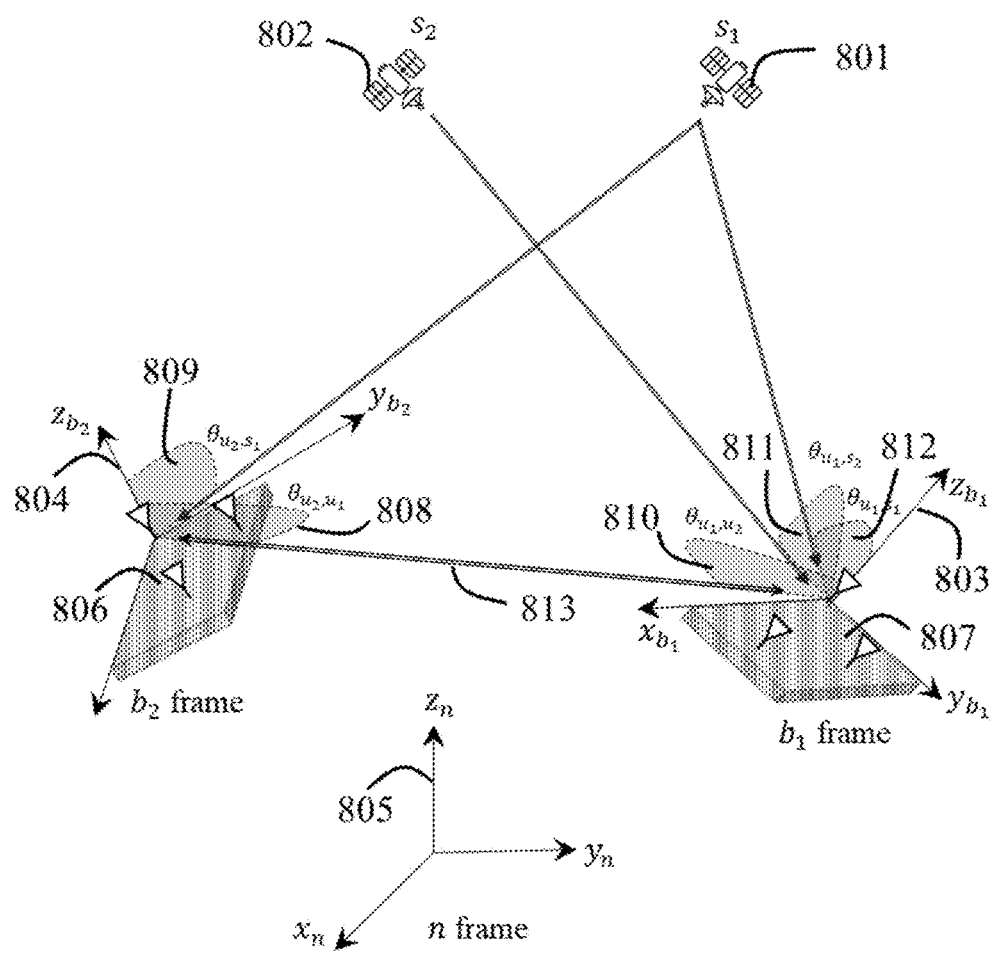
FIG. 8: Two platforms in 3D space with unknown orientation where each see a few anchor points

Using (78) only provides relative orientation information. In words, this tells us how one platform (with unknown absolute orientation) is oriented with respect to the other (with unknown absolute orientation). Nonetheless, in order to estimate the absolute orientation of platforms in navigation frame, some reference (anchor) points are needed. These reference points can be GNSS satellites or any other point which location in the navigation frame of reference is precisely known. FIG. 8 illustrates a more elaborative version of the previous example. In this embodiment, there are two platforms 806 and 807 in 3D space with unknown orientation where each is capable of receiving signals from some reference points as well as the other platform. Without restricting the scope of this invention, we use GNSS satellites 801 and 802 as anchor points in this embodiment.

Let's denote the unknown orientations of platforms one and two by Euler angles $(\alpha_1, \beta_1, \gamma_1)$ and $(\alpha_2, \beta_2, \gamma_2)$, respectively. Given that the platform one 807 can receive signals from two satellites 801 and 802, it can immediately estimate its orientation using the following formula $$[y_{u_1,s_1}^{b_1}, y_{u_1,s_2}^{b_1}] = R^{b_1 n}(\alpha_1, \beta_1, \gamma_1)[y_{u_1,s_1}^n, y_{u_1,s_2}^n] \quad (79)$$

where, $y_{u_1,s_1}^{b_1}$ and $y_{u_1,s_2}^{b_1}$ are body frame representations of the unit pointing vectors, which are expressed in terms of AoAs as follows $$y_{u_1,s_1}^{b_1} = [\sin \theta_{u_1,s_1} \cos \phi_{u_1,s_1}, \sin \theta_{u_1,s_1} \sin \phi_{u_1,s_1}, \cos \theta_{u_1,s_1}]$$

$$y_{u_1,s_2}^{b_1} = [\sin \theta_{u_1,s_2} \cos \phi_{u_1,s_2}, \sin \theta_{u_1,s_2} \sin \phi_{u_1,s_2}, \cos \theta_{u_1,s_2}] \quad (80)$$

Not to that, in order to avoid cluttering this figure, we have not shown the angles $\phi_{u_1,s_1}$, $\phi_{u_1,s_2}$, and $\phi_{u_2,s_1}$ which are the angles subtended between the x-axes of the body-frames and the projections of pointing vectors (to satellite) onto the x-y planes.

The representation of these vectors in the navigation frame 805 is also known if the location of the reference points and the terminal are known (in the navigation frame). In fact, in the specific embodiment illustrated in FIG. 8, where reference points 801 and 802 are GNSS satellites, the locations p of the satellites are known, and the location of the user l is obtained from processing the GNSS signals. Therefore, $$y_{u_1,s_1}^n = \frac{p_{s_1}^n - l_{u_1}^n}{|p_{s_1}^n - l_{u_1}^n|} \quad (81)$$

$$y_{u_1,s_2}^n = \frac{p_{s_2}^n - l_{u_1}^n}{|p_{s_2}^n - l_{u_1}^n|}$$

Due to the blockage, platform 2 does not receive the signal from satellite 802 but only from satellite 801. This poses a challenge to unambiguous estimation of its orientation:

$$[y_{u_2,s_1}^{b_2}] = R^{b_2 n}(\alpha_2, \beta_2, \gamma_2)[y_{u_2,s_1}^n] \quad (82)$$

$$y_{u_2,s_1}^{b_2} = [\sin\theta_{u_2,s_1}\cos\phi_{u_2,s_1}, \sin\phi_{u_2,s_1}, \cos\theta_{u_2,s_1}]$$

$$y_{u_2,s_1}^n = \frac{p_{s_1}^n - l_{u_2}^n}{|p_{s_1}^n - l_{u_2}^n|}$$

Owing to the possibility of side-link binding achieved by exchanging reference signals between the two platforms on the link 813, the following constraining relation is established which makes it possible to unambiguously estimate both platforms' orientations:

$$y_{u_2,u_1}^{b_2} = R^{b_2 n}(\alpha_2,\beta_2,\gamma_2)[R^{b_1 n}(\alpha_1,\beta_1,\gamma_1)]^T y_{u_1,u_2}^{b_1}$$

$$y_{u_2,u_1}^{b_2} = [\sin_{u_2,u_1}\cos\phi_{u_2,u_1}, \sin\theta_{u_2,u_1}\sin\phi_{u_2,u_1}, \cos\theta_{u_2,u_1}]$$

$$y_{u_1,u_2}^{b_2} = [\sin_{u_1,u_2}\cos\phi_{u_1,u_2}, \sin\theta_{u_1,u_2}\sin\phi_{u_1,u_2}, \cos\theta_{u_1,u_2}] \quad (83)$$

This equation uses the sidelink zeniths $\theta_{u_2,u_1}$ 808 and $\theta_{u_1,u_2}$ 810 as well the corresponding azimuths $\phi_{u_2,u_1}$ and $\phi_{u_1,u_2}$ (which was not shown to simplify the figure). Again, the azimuths $\phi_{u_2,u_1}$ and $\phi_{u_1,u_2}$ are the angles subtended between the x-axes of the body frames and the projection of the pointing vector 813 on the x-y plane of the body frames. The nature of the joint orientation estimation problem is distributed. This is owing to the fact that observations are collected distributedly at the locations of platforms 806 and 807 which are not collocated, and which orientations change independently from each other. To solve problems of such nature, two mainstream approaches exist: Central processing and distributed processing. Several embodiments of this invention reveal the details related to each of these approaches.

Central Processing

Figure 9:
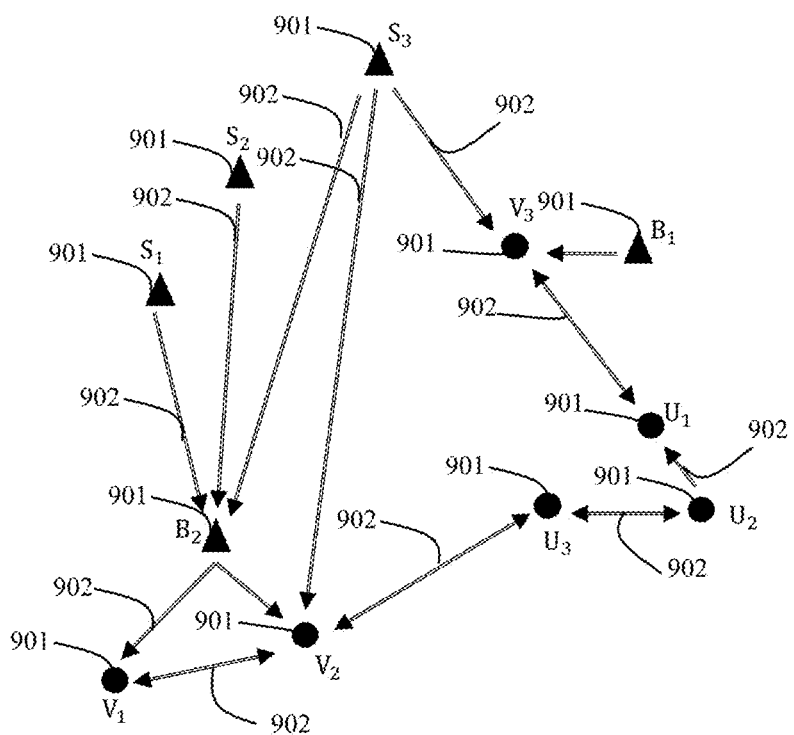
FIG. 9: RS exchange graph
Figure 10:
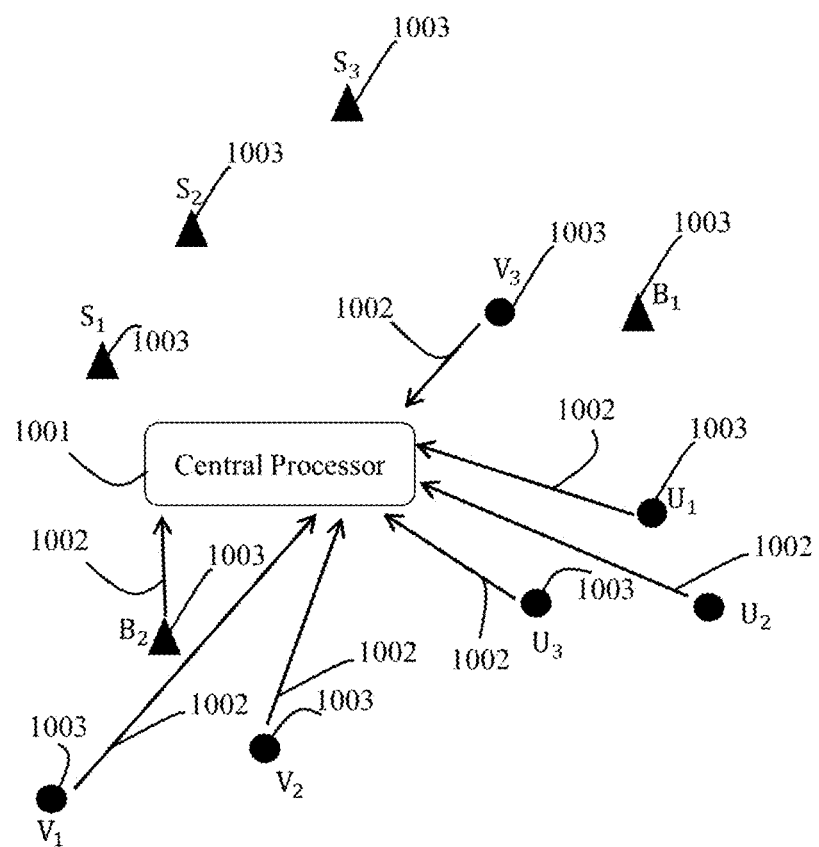
FIG. 10: Measurement communication
Figure 11:
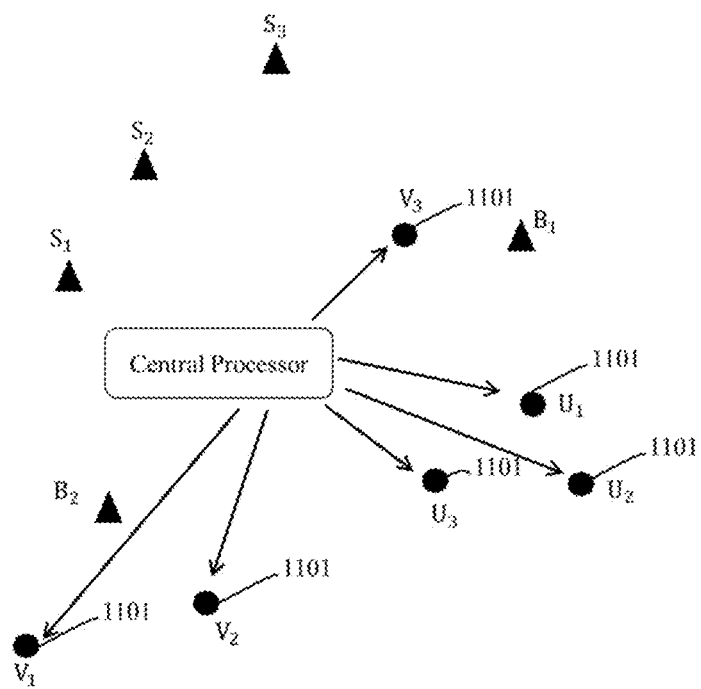
FIG. 11: Inference communication

The central processing and optimization of the joint estimation problem is a more optimal approach. This is because all observations across the network are processed simultaneously, hence, yielding estimates that enjoy the synergy achieved by joint processing. The downside of the central processing is in the fact that it depends on a single processing unit which is prone to failure. The central approach also requires fast and reliable communication links between the platforms, which collect the observations, and the central processing node to aggregate the observations. FIG. 9 shows the graph of reference signal transmission between different entities in the example of FIG. 5. Let's denote this graph by ($\mathcal{V}, \varepsilon$) where $\mathcal{V}$ represents nodes 901 of the graph and $\varepsilon$ represents the edges 902 of the graph. Once an observation is collected at a platform, it will be transmitted, by nodes 1003, to the central processing unit 1001 on links 1002 as shown in FIG. 10. Upon receiving the observations from all the intended platforms in the processing cluster, the central processing 1001 unit forms an optimization problem that involves unknown orientations of a subset of the platforms 1003 in that cluster. It then solves the joint problem and relays the estimates back to the involved platforms 1101. This is illustrated in FIG. 11.

In one embodiment of this invention, the central processing unit solves a centralized least square optimization problem as shown below $$\max_{\{R^{bn}\}} \sum_{(j,k)\in\varepsilon} |(R_j^{bn})^T Y_j^b - (R_k^{bn})^T Y_k^b|_{Fro}^2 \text{ Subject to: } R_j^{bn}(R_j^{bn})^T = I, j \in \mathcal{V} \quad (84)$$

Note that if $j \in \mathcal{V}$ is a reference node (such as GNSS satellite), then we replace $(R_j^{bn})^T Y_j^b$ in (84) by $Y_j^n$ where $Y_j^n$ is the pointing vector in the navigation frame. In general, this problem can be solved by different approaches. In one embodiment, the inventors succeeded in solving this problem using one of the variants of iterative coordinate descent. This was achieved by freezing all the variables, except one, namely, the floating variable. The value that the frozen variable takes in the current iteration is the best estimate that was obtained for that variable in an earlier iteration where it was floating. This converts the problem in each iteration to a single variable optimization problem which closed-form solution we introduced before. In the next iteration, the solver moves on to another variable which was fixed in an earlier iteration. After a certain number of iterations, this solution will converge and estimates become available for all the platforms in the processing cluster which orientations are of interest.

Distributed Processing

An alternative to central processing is to take advantage of the processing capabilities of one or more nodes to solve the joint estimation problem. Unlike the central processing approach where the non-collocated measurements shall first be gathered at a single processing unit before solving a centralized optimization problem (that involves solving all unknown orientations), the distributed processing relies on multiple processing nodes to solve the optimization problem distributedly. These processing nodes might be some of the platforms which orientations are to be estimated or multiple cluster-heads that are in the proximity of a few of the platforms. In the latter case, the cluster-head collects measurements from its nearby platforms, fuse the measurements locally and exchange some intermediary beliefs about the unknown platforms' orientations with the other cluster-heads. In the former case, these are the platforms themselves that fuse their local measurements in order to create beliefs that have to be exchanged with others. The choice of one of these approaches depends on many factors and trade-offs ranging from the transmission capabilities to the processing capabilities, to the energy constraints of the platforms. One way or the other, the distributed processing depends on the exchanging of the beliefs between processing parties until convergence is achieved. What to calculate and who to send the local inference results to are decided by one of the variants of the belief propagation and message passing algorithms. As an embodiment of this invention, authors successfully implemented a variant of sum-product algorithm on a factor-graph to minimize the communication load between the processing parties and accelerate the convergence time. The choice of how many processing parties to have in a processing cluster is a trade-off between communications, computation, and speed of convergence. For instance, larger number of processing entities means that less communications are required between a processing party and the platform in its neighborhood but more communication load between the processing parties themselves.

Figure 12:
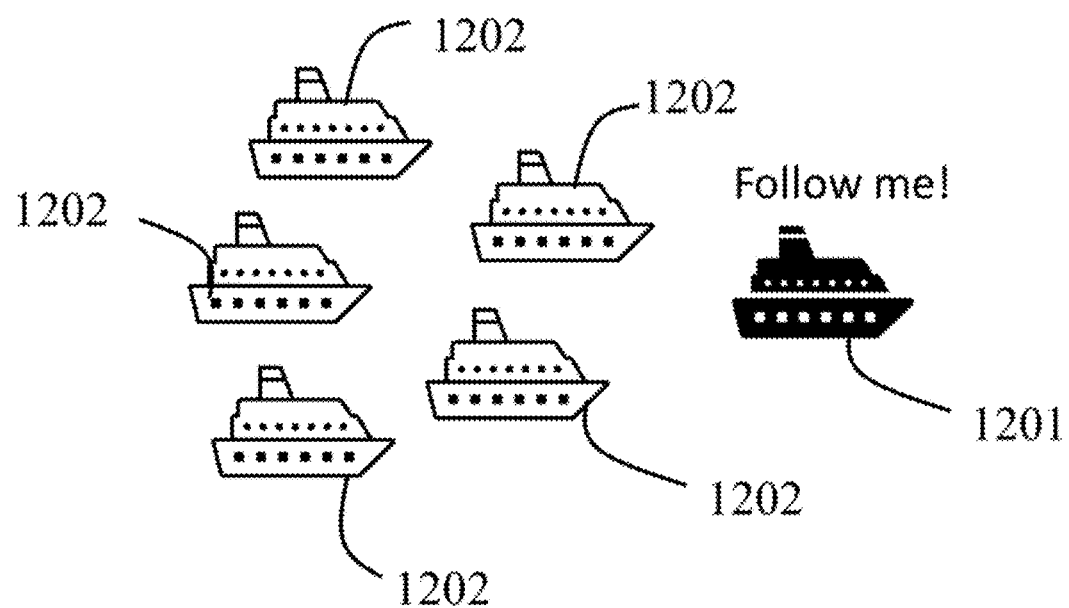
FIG. 12: Relative orientation alignment ($1^{st}$ scenario).
Figure 13:
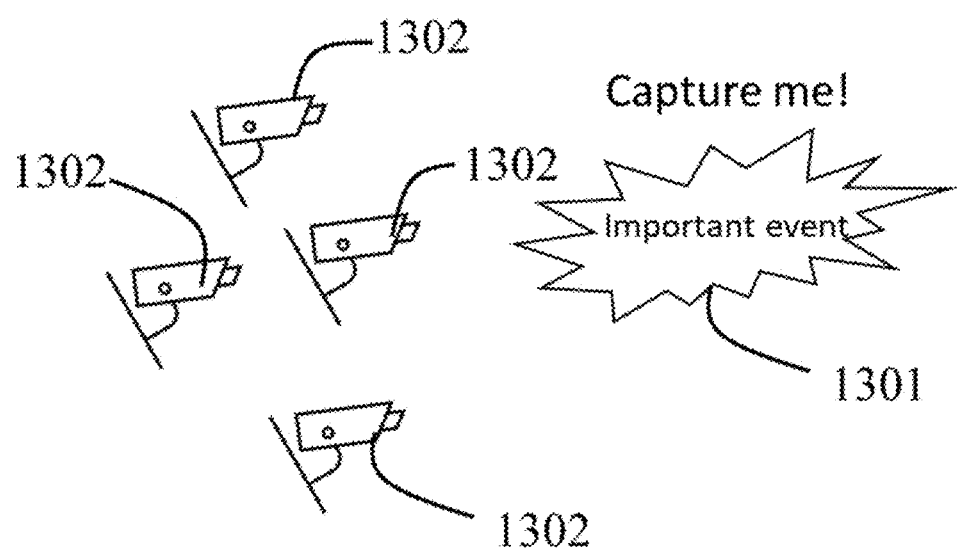
FIG. 13: Relative orientation alignment ($2^{nd}$ scenario).
Figure 14:
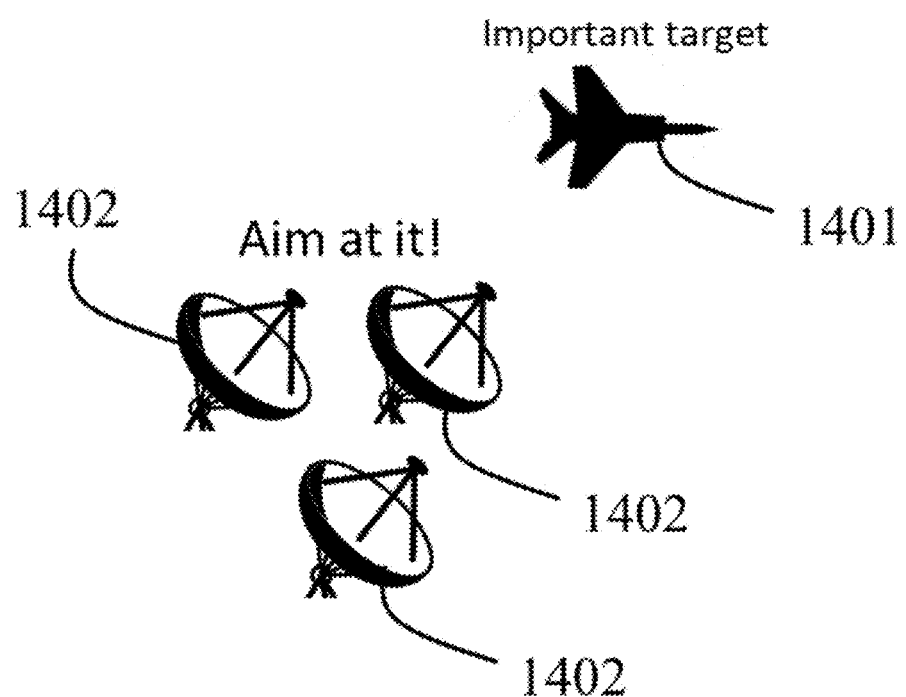
FIG. 14: Relative orientation alignment ($3^{rd}$ scenario).

Another Important embodiment of the disclosed idea is relative orientation estimation. Imagine a scenario where there are no reference points in the environment but only mobile platforms of unknown orientation. The goal is not for the mobile platforms to know their orientations in the global navigation coordinate system. Instead, the objective is to align them so that they all have the same orientation. There are many use case that benefit from such capabilities. In short, many multi-agent systems wherein the swarmed and harmonized behaviour of individuals is required, is going to benefit from this. A few examples are shown in FIGS. 12, 13, and 14. In this FIG. 12, the head-of-line ship 1201 navigates, and the remaining ships 1202 follow. It is important that a certain formation is maintained to avoid collision, etc. This example can be extended to drones, fighters, etc. In FIG. 13, proper orientation alignment enables a bunch of cameras 1302 with motorized pedestals to point at an event of interest 1301 that was detected/identified by one of these cameras. In FIG. 14, an intruding fighter jet 1401 is more reliably detected through collaboration of multiple radar bases 1402 owing to the fact that they were able to orient themselves towards a target collaboratively.

Figure 15:
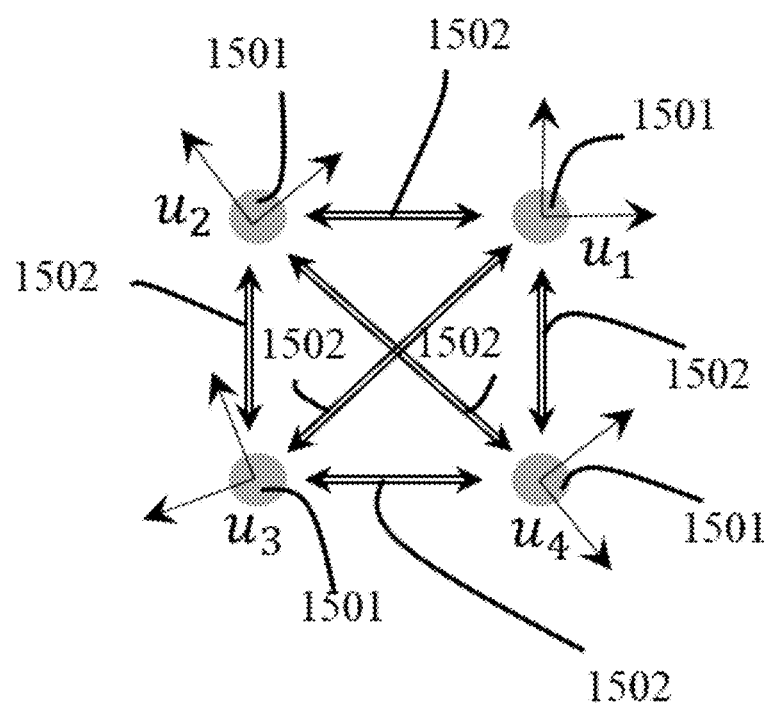
FIG. 15: An example of relative joint orientation estimation.

With this introduction, let's work on the scenario of FIG. 15 where 4 platforms 1501 (denoted by circles) conduct angulations with each other. We assume a complete graph here where each platform angulates with the three remaining platforms. This figure also shows the orientations of the platforms. Since the objective is relative orientation estimation, we take one of the platforms as the reference of orientation w.r.t which the other platforms' attitudes find meaning.

Let's denote the vector 1502 extending between platform i and platform j by $y_{i,j}$. This vector has two representations, one in i, denoted by $y_{i,j}^i$ and, another in j, denoted by $y_{i,j}^j$. We showed earlier how these two representations can be obtained after estimating look angles using arrays of antennas on the platforms. Given this notation, and knowing that there are six binding links in this graph, six matrix equations is obtained as follows $$\begin{cases} y_{1,2}^1 = R^{1,2} y_{1,2}^2 = R^{1,n} R^{n,2} y_{1,2}^2 \\ y_{1,3}^1 = R^{1,3} y_{1,3}^3 = R^{1,n} R^{n,3} y_{1,3}^3 \\ y_{1,4}^1 = R^{1,4} y_{1,4}^4 = R^{1,n} R^{n,4} y_{1,4}^4 \\ y_{2,4}^2 = R^{2,4} y_{2,4}^4 = R^{2,n} R^{n,4} y_{2,4}^4 \\ y_{2,3}^2 = R^{2,3} y_{2,3}^3 = R^{2,n} R^{n,3} y_{2,3}^3 \\ y_{3,4}^3 = R^{3,4} y_{3,4}^4 = R^{3,n} R^{n,4} y_{3,4}^4 \end{cases} \quad (26)$$

Rearranging (24), yields $$\begin{cases} (y_{1,2}^1)^T R^{1,n} = (y_{1,2}^2)^T R^{2,n} \\ (y_{1,3}^1)^T R^{1,n} = (y_{1,3}^3)^T R^{3,n} \\ (y_{1,4}^1)^T R^{1,n} = (y_{1,4}^4)^T R^{4,n} \\ (y_{2,4}^2)^T R^{2,n} = (y_{2,4}^4)^T R^{4,n} \\ (y_{2,3}^2)^T R^{2,n} = (y_{2,3}^3)^T R^{3,n} \\ (y_{3,4}^3)^T R^{3,n} = (y_{3,4}^4)^T R^{4,n} \end{cases} \quad (27)$$

Embedding these matrix equations into a block-matrix form, $$\begin{bmatrix} (y_{1,2}^1)^T & 0 & 0 & 0 \\ (y_{1,3}^1)^T & 0 & 0 & 0 \\ (y_{1,4}^1)^T & 0 & 0 & 0 \\ 0 & (y_{2,4}^2)^T & 0 & 0 \\ 0 & (y_{2,3}^2)^T & 0 & 0 \\ 0 & 0 & (y_{3,4}^3)^T & 0 \end{bmatrix} \begin{bmatrix} R^{1,n} \\ R^{2,n} \\ R^{3,n} \\ R^{4,n} \end{bmatrix} = \quad (28)$$

$$\begin{bmatrix} 0 & (y_{1,2}^2) & 0 & 0 \\ 0 & 0 & (y_{1,3}^3)^T & 0 \\ 0 & 0 & 0 & (y_{1,4}^4)^T \\ 0 & 0 & 0 & (y_{2,4}^4)^T \\ 0 & 0 & (y_{2,3}^3)^T & 0 \\ 0 & 0 & 0 & (y_{3,4}^4)^T \end{bmatrix} \begin{bmatrix} R^{1,n} \\ R^{2,n} \\ R^{3,n} \\ R^{4,n} \end{bmatrix}$$

Combing both sides, results in $$\begin{bmatrix} (y_{1,2}^1)^T & -(y_{1,2}^2)^T & 0 & 0 \\ (y_{1,3}^1)^T & 0 & -(y_{1,3}^3)^T & 0 \\ (y_{1,4}^1)^T & 0 & 0 & -(y_{1,4}^4)^T \\ 0 & (y_{2,4}^2)^T & 0 & -(y_{2,4}^4)^T \\ 0 & (y_{2,3}^2)^T & -(y_{2,3}^3)^T & 0 \\ 0 & 0 & (y_{3,4}^3)^T & -(y_{3,4}^4)^T \end{bmatrix} \begin{bmatrix} R^{1,n} \\ R^{2,n} \\ R^{3,n} \\ R^{4,n} \end{bmatrix} = \begin{bmatrix} 0 \\ 0 \\ 0 \\ 0 \\ 0 \\ 0 \end{bmatrix}$$

Since we assumed that platform one is the reference platform, we take it out of the unknown vector and move it to the right-hand-side. This results in the following form:

$$\begin{bmatrix} -(y_{1,2}^2)^T & 0 & 0 \\ 0 & -(y_{1,3}^3)^T & 0 \\ 0 & 0 & -(y_{1,4}^4)^T \\ (y_{2,4}^2)^T & 0 & -(y_{2,4}^4)^T \\ (y_{2,3}^2)^T & -(y_{2,3}^3)^T & 0 \\ 0 & (y_{3,4}^3)^T & -(y_{3,4}^4)^T \end{bmatrix} \begin{bmatrix} R^{2,n} \\ R^{3,n} \\ R^{4,n} \end{bmatrix} = \quad (29)$$

$$\begin{bmatrix} (y_{1,2}^1)^T \\ (y_{1,3}^1)^T \\ (y_{1,4}^1)^T \\ 0 \\ 0 \\ 0 \end{bmatrix} R^{1,n} \text{ subject to}$$

$$R^{2,n}(R^{2,n})^T = I$$
$$R^{3,n}(R^{3,n})^T = I$$
$$R^{4,n}(R^{4,n})^T = I$$

To solve this, an optimization ideas similar to the one introduced before shall be applied. This optimization problem is linear in the objective function and quadratic in constraints. Even if this is an example of non-convex problem (due to non-affinity of the equality constraint), it can be solved through transformations. Note that the solution obtained for each platform is parametrized with $R^{1,n}$ which is the rotation matrix of the reference platform 1.

BENEFITS OF THE INVENTION

The benefits of the proposed solution compared to the state-of-the-art orientation determination approaches are the following
Cheaper solution to manufacture
Smaller form-factor
Higher reliability and Availability
Better Accuracy
Higher Continuity
Less Power Consumption

REFERENCES

[1] https://patents.google.com/patent/US20090093959
[2] https://patents.google.com/patent/US6469663B1/en

What is claimed is:

1. A method of jointly estimating orientation of plurality of platforms comprising:
   Transmitting primary reference signals on one or more frequencies from one or more transmit anchor points which locations are known;
   Receiving said primary reference signals on plurality of frequencies from plurality of transmit anchor points at plurality of platforms;
   Measuring phases of a subset of said primary reference signals received by each of the said platforms using an array of antennas across space and/or time;
   Obtaining location of said platform and transmit anchor points corresponding to the said subset of said primary reference signals;
   Estimating angle-of-arrivals (AoAs) of said subset of said primary received reference signals at said platform using said phase measurements;
   Transmitting secondary reference signals from plurality of said platforms;
   Receiving said secondary reference signals at a subset of said platforms;
   Measuring phases of said received secondary reference signals by an array of antennas at each platform in said subset of said platforms across space and/or time;
   Estimating angle-of-arrivals (AoAs) of said received secondary reference signals at said platform in the said subset of said platforms from the said phase measurements;
   Estimating orientation of said platforms from said estimated AoAs of said received secondary reference signals, said estimated AoAs of said primary reference signals, said locations of said subset of said platforms that estimated said AoAs of said primary reference signals, and said locations of said transmit anchor points that transmitted said primary reference signals that were B used to estimate the said AoAs.

2. The method of claim 1, wherein there is no transmission, reception, and processing of said secondary reference signals at any of said platforms, where estimation of orientation of a platform is based on said estimated AoAs of said primary reference signals, said locations of said transmit anchor points that transmitted said primary reference signals that were used to estimate the said AoAs, and said location of said platform.

3. The method of claim 1 or 2, wherein one or more of said transmit anchor points are GNSS satellites, one or more of said primary reference signals are GNSS signals transmitted by said GNSS satellites on one or more GNSS frequencies.

4. The method of claim 3 wherein said GNSS-based AoA measurements at each said platform is collected either across space, by processing said GNSS signals received from at least two separate GNSS satellites simultaneously or, across time by processing said GNSS signals from one GNSS satellite transmitted at different times.

5. The method of claim 1, wherein one or more of said transmit anchor points are cellular base stations that can be fixed terrestrial or mobile aerial base stations, where said primary reference signals are reference signals in the context of cellular networks, where secondary reference signals are side-link reference signals in the context of cellular networks.

6. The method of claim 1 wherein each said platform estimates each said AoA of each said primary received signal from each said transmit anchor point by coherently and synchronously processing said phase measurements in time and/or frequency and/or space, and each said AoA of each said secondary received signal from each said transmitting platform by coherently and synchronously processing said phase measurements in time and/or frequency and/or space.

7. The method of claim 1 to estimate orientations of said platforms centrally wherein:
   Transmitting by said measuring platforms to a central processing unit said measurements and the identity of said platforms involved in transmitting and receiving the RSs, which are used to obtain the said measurements, or in case of anchor-based measurement, the identities of the transmit anchor points and the measurements obtained from the primary reference signals received from said transmit anchor points;
   Receiving said measurements by said central processor;
   Processing jointly said received measurements by said central processing unit to estimate orientations of said platforms;
   Transmitting said estimated orientations to those platforms which orientations are estimated by the said central processing unit.

8. The method of claim 7 wherein said central processing unit solves the joint orientation estimation problem by forming a general cost function, such as a weighted least square cost function, using said measurements collected from plurality of platforms.

9. The method of claim 8 wherein said general cost function is minimized through one of the variants of iterative optimization algorithm where, within each iteration, a different sub-cost-function is obtained and solved, which only unknown variable is one of the said platform orientations, which known variables are functions of some other platforms' orientation estimates in the previous iteration and some other platforms' AoA measurements.

10. The method of claim 7 further comprising:
    Obtaining at the measuring platform some statistics on said measurement links from which said angle estimates are obtained, where said statistics can be any of measured power, signal-to-noise ratio (SNR), SNR variance, noise power, AoA variance, range variance, or any other statistic that is indicative of a better geometric distribution of platforms or line-of-sight (LoS) or non-line-of-sight (NLoS) nature of said measurement links;
    Transmitting by said measuring platform to said central processing unit said statistics;

Processing by said central processing unit said statistics received from said platforms to reject said measurements that obtained from unfavourable geometric distribution of measurement links or NLoS measurement links;

Processing jointly said accepted received measurements by said central processing unit to estimate orientations of said platforms;

Transmitting said estimated orientations to those platforms which orientations are estimated by the said central processing unit.

11. The method of claim 1 to estimate orientations of said platforms distributedly wherein:

Each platform from pool of said platforms receives belief messages from plurality of its neighbouring platforms about its own orientation;

Each said platform computes its belief about the orientation of each candidate platform in said neighbouring platforms using:
said belief messages received from said neighbours except the belief message received from said candidate platform;
said AoA measurement locally obtained from processing said secondary reference signal exchanged between said computing platform and said candidate neighbour;
said AoA measurements locally obtained from processing said primary reference signal received from said transmit anchor points, location estimate of said computing platform, and said locations of said transmit anchor points which signals were used to estimate the said AoA measurements;

Each said platform transmits said computed belief to said neighbouring platform;

The receiving/computing/transmitting of belief messages are iteratively repeated by different platforms until convergence is achieved.

12. The method of claim 11 wherein a factor graph on said platforms is first established centrally or distributedly whereupon message-passing and sum-product algorithm is performed on said factor-graph to calculate said belief messages.

13. The method of claim 1 wherein plurality of platforms independently estimate their orientations using said primary reference signals received from said transmit anchor points, transmit said estimated orientations and/or measurements to the remaining platforms or to said central processing unit over communication links, where said communication link can be a decentralized link between the transmitting platform and the receiving platform, or a centralized terrestrial/non-terrestrial link.

14. The method of claim 1 further comprising:

One or more of said receiving platforms estimate Angle-of-departure (AoDs) of said primary or secondary reference signals.

* * * * *